United States Patent
Lee et al.

(10) Patent No.: US 10,069,412 B2
(45) Date of Patent: Sep. 4, 2018

(54) VOLTAGE CONVERTER FOR POWER MANAGEMENT

(71) Applicant: SAMSUNG ELECTRONICS CO., LTD., Suwon-si, Gyeonggi-Do (KR)

(72) Inventors: Kyoung-Jin Lee, Seoul (KR); Ha-Neul Kim, Seoul (KR); Hyoung-Seok Oh, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 384 days.

(21) Appl. No.: 15/041,723

(22) Filed: Feb. 11, 2016

(65) Prior Publication Data

US 2016/0329734 A1    Nov. 10, 2016

(30) Foreign Application Priority Data

May 6, 2015    (KR) .................. 10-2015-0062888

(51) Int. Cl.
    *H02M 3/156*    (2006.01)
    *H02M 3/158*    (2006.01)
    *H02M 1/00*    (2006.01)

(52) U.S. Cl.
    CPC .......... *H02M 3/156* (2013.01); *H02M 3/1582* (2013.01); *H02M 2001/0025* (2013.01); *H02M 2001/0032* (2013.01); *Y02B 70/16* (2013.01)

(58) Field of Classification Search
    CPC ...... H02M 3/135; H02M 3/155–3/158; H02M 2003/1566; G05F 1/462; G05F 1/56
    USPC .......................... 323/265, 282–285, 349, 351
    See application file for complete search history.

(56) References Cited

U.S. PATENT DOCUMENTS

| | | | |
|---|---|---|---|
| 7,579,820 B2 | 8/2009 | Hane | |
| 7,679,348 B2 | 3/2010 | Sohma | |
| 7,898,235 B2 | 3/2011 | Seo | |
| 7,974,107 B2 | 7/2011 | Li et al. | |
| 8,285,502 B2 * | 10/2012 | Kenly | G01R 19/0092 |
| | | | 702/108 |
| 8,755,203 B2 | 6/2014 | Li et al. | |
| 2012/0119719 A1 * | 5/2012 | Teh | H02M 3/1588 |
| | | | 323/282 |
| 2012/0187928 A1 | 7/2012 | Parto et al. | |

(Continued)

FOREIGN PATENT DOCUMENTS

| | | |
|---|---|---|
| JP | 2007-209180 | 8/2007 |
| JP | 2014-007809 | 1/2014 |

(Continued)

*Primary Examiner* — Adolf Berhane
(74) *Attorney, Agent, or Firm* — F. Chau & Associates, LLC

(57) ABSTRACT

A voltage converter includes a converting circuit and a switching control circuit, where the converting circuit includes an inductor connected to a switching node, a first switching device connected between the switching node and a common voltage and a second switching device connected to the switching node, where the first switching device charges the inductor and discharges the inductor in response to a control signal, and the switching control circuit generates the control signal by performing a PWM and a PFM based on a first sensing signal, a second sensing signal and a feedback signal, and adjusts a charging time of the inductor on a time basis, based on at least the input power supply voltage when the switching control circuit performs the PFM.

20 Claims, 21 Drawing Sheets

(56) References Cited

U.S. PATENT DOCUMENTS

| | | | |
|---|---|---|---|
| 2014/0145698 A1* | 5/2014 | Saito | G05F 1/468 |
| | | | 323/285 |
| 2014/0266090 A1 | 9/2014 | Wei et al. | |
| 2015/0214827 A1* | 7/2015 | Yoon | H02M 3/1588 |
| | | | 323/286 |
| 2015/0229212 A1* | 8/2015 | Shiwaya | H02M 3/158 |
| | | | 323/282 |
| 2016/0380540 A1* | 12/2016 | Moon | G01R 19/04 |
| | | | 323/235 |
| 2017/0187278 A1* | 6/2017 | Yamaguchi | H02M 1/088 |

FOREIGN PATENT DOCUMENTS

| | | |
|---|---|---|
| JP | 2014-050308 | 3/2014 |
| KR | 1020060128194 | 12/2006 |
| KR | 1020130035242 | 4/2013 |

* cited by examiner

VOLTAGE CONVERTER FOR POWER MANAGEMENT

CROSS-REFERENCE TO RELATED APPLICATION

This application claims priority under 35 USC § 119 to Korean Patent Application No. 10-2015-0062888, filed on May 6, 2015 in the Korean Intellectual Property Office (KIPO), the content of which is herein incorporated by reference in its entirety.

TECHNICAL FIELD

Exemplary embodiments relate generally to power supply devices, and more particularly to voltage converters and power management devices including the same.

DISCUSSION OF RELATED ART

Generally, power supply devices are used to supply voltage for operation of electronic devices. One type of power supply device is a voltage converter, such as a DC-DC converter. DC-DC converters are used in various types of electronic devices to efficiently provide a stable power supply voltage according to an output load.

SUMMARY

Exemplary embodiments of the present inventive concept provide a voltage converter capable of increasing power transfer efficiency and performing stable mode transition. An exemplary embodiment provides a power management device including the voltage converter.

According to an exemplary embodiment, a voltage converter includes a converting circuit, and a switching control circuit. The converting circuit includes an inductor connected to a switching node, a first switching device connected between the switching node and a common voltage and a second switching device connected between the switching node and an output node. The first switching device charges an input power supply voltage in the inductor and discharges the inductor in response to a driving control signal. The switching control circuit generates the driving control signal by performing a pulse-width modulation (PWM) and a pulse-frequency modulation (PFM) based on a first sensing signal, a second sensing signal and a feedback voltage. The first sensing signal and the second sensing signal are based on a sensed current flowing through the first switching device, and the feedback voltage is obtained by dividing an output voltage at the output node. The switching control circuit adjusts a charging time of the inductor on a time basis, based on at least the input voltage when the switching control circuit performs the PFM.

In an exemplary embodiment, the switching control circuit may include an on-time controller, a pulse generation circuit, a mode controller and a driving controller. The on-time controller may generate an on-time control pulse that adjusts the charging time of the inductor based on the input power supply voltage and a reference voltage. The pulse generation circuit may generate a first pulse signal by performing the PWM and may generate a second pulse signal by performing the PFM based on the reference voltage, the first sensing signal, the second sensing signal, the feedback voltage and the on-time control pulse, and may generate a mode signal indicating a difference between the reference voltage and the feedback voltage. The first sensing signal may indicate a level of the sensed current and the second sensing signal may indicate a zero level of the sensed current. The mode controller may select one of the first pulse signal and the second pulse signal as an output pulse signal according to the mode signal and an operation mode based on the on-time control pulse. The driving controller may generate the driving control signal based on the output pulse signal.

The mode controller may select one of the first pulse signal and the second pulse signal as the output pulse signal based on comparing a first on-time and a second on-time. The first on-time may correspond to a first activation interval of the first pulse signal and the second on-time may correspond to a second activation interval of the second pulse signal.

The mode controller may change the operation mode from a PWM mode to a PFM mode when the first on-time is smaller than the second on-time by a reference number or threshold.

The on-time controller may include an enable signal generator, a current mirror circuit and an on-time pulse generator. The enable signal generator may generate a first enable signal and a second enable signal based on control signals from outside and a reference pulse signal. The current mirror circuit may generate a charging current by mirroring a reference current in response to the first enable signal. The on-time pulse generator may generate the on-time control pulse based on the first enable signal, the second enable signal, the charging current and the reference voltage and the input power supply voltage.

The enable signal generator may include a first AND gate, a second AND gate and an invert. The first AND gate may perform an AND operation on the reference pulse signal and a calibration enable signal of the control signals. The second AND gate may perform an AND operation on an output of the first AND gate a controller enable signal of the control signals to output the first enable signal. The controller enable signal may direct an activation of the on-time controller. The inverter may invert the first enable signal to output the second enable signal.

The on-time pulse generator may include a first capacitor, a first switch, at least one second switch and at least one second capacitor, a comparator and a flip-flop. The first capacitor may be connected between a first node coupled to the current mirror circuit and a common voltage, and may store the charging current. The first switch may be connected in parallel with the first capacitor between the first node and the common voltage, and the first switch may be switched in response to the second enable signal. The at least one second switch and the at least one second capacitor may be connected in series between the first node and the common voltage. The comparator may compare a ramp voltage at the first node and the reference voltage. The flip-flop may have a set terminal receiving the first enable signal, a reset terminal receiving an output of the comparator and an output terminal providing the on-time control pulse.

The at least one second switch may be switched in response to an external switching control signal and the at least one second capacitor may store at least one of the input power supply voltage and a compensation voltage corresponding to a calibration code.

An on-time of the on-time control pulse may be varied according to a level of the ramp voltage.

The pulse generation circuit may include a first pulse generator and a second pulse generator. The first pulse generator may generate the first pulse signal based on the reference voltage, the feedback voltage and the first sensing signal. The second pulse generator may generate the second pulse signal based on the reference voltage, the feedback voltage, the second sensing signal and the on-time control pulse.

The second pulse generator may include a first hysteresis comparator, a second hysteresis comparator, a first OR gate, a second OR gate and a flip-flop. The first hysteresis comparator may generate a PFM signal corresponding to a difference between the feedback voltage and the reference voltage, and may have a variable hysteresis window. The second hysteresis comparator may generate the mode signal corresponding to a difference between the reference voltage and the feedback voltage. The first OR gate may perform an OR operation on the PFM signal and the second sensing signal. The second OR gate may perform an OR operation on the mode signal and the on-time control pulse. The flip-flop may have a set terminal receiving an output of the first OR gate, a reset terminal receiving an output of the second OR gate and an output terminal providing the second pulse signal.

The mode controller may include a time comparator, a counter, a signal generator and a selection circuit. The time comparator may compare a first on-time corresponding to first activation interval of the first pulse signal and a second on-time corresponding to a second activation interval of the second pulse signal to output a time comparison signal. The counter may count the time comparison signal having a first logic level to output a counting output signal. The signal generator may generate a reset signal and a selection signal based on the counting output signal and the mode signal. The selection circuit may select one of the first pulse signal and the second pulse signal as the output pulse signal in response to the selection signal.

The counter may output the counting output signal as a first logic level when the time comparator consecutively outputs the time comparison signal as a first logic level by a reference number of times.

The signal generator may output the selection signal as a first logic level when the mode signal has a first logic level and the counting output signal has a first logic level.

In an exemplary embodiment, first switching device may include an n-channel power switch, the second switching device may include a diode connected between the switching node and the output node, and the voltage converter may be an asynchronous boost converter.

In an exemplary embodiment, the first switching device may include an n-channel power switch, the second switching device may include a p-channel power switch connected between the switching node and the output node, and the voltage converter may be a synchronous boost converter.

In an exemplary embodiment, the converting circuit may further include a third switching device. The third switching device may be connected between the input power supply voltage and the inductor, and the third switching device may switch the input power supply voltage to the inductor in response to a boosting control signal. The third switching device may include a p-channel power switch.

According to an exemplary embodiment, a voltage converter includes a converting circuit and a switching control circuit. The converting circuit includes an inductor connected to a switching node, a first switching device connected to the switching node and a second switching device connected between the switching node and an output node. The first switching device charges an input power supply voltage in the inductor in response to a first driving control signal and the second switching device discharges the inductor in response to a second driving control signal. The switching control circuit generates the first driving control signal and the second driving control signal by performing a pulse-width modulation (PWM) and a pulse-frequency modulation (PFM) based on a first sensing signal, a second sensing signal and a feedback voltage. The first sensing signal and the second sensing signal is based on an inductor current flowing through the inductor, and the feedback voltage is obtained by dividing an output voltage at the output node. The switching control circuit adjusts a charging time of the inductor on a time basis, based on at least the input voltage when the switching control circuit performs the PFM.

In an exemplary embodiment, the switching control circuit may include an on-time controller, a pulse generation circuit, a mode controller and a driving controller. The on-time controller may generate an on-time control pulse that adjusts the charging time of the inductor based on the input power supply voltage and a reference voltage. The pulse generation circuit may generate a first pulse signal by performing the PWM, may generate a second pulse signal by performing the PFM based on the reference voltage, the first sensing signal, the second sensing signal, the feedback voltage and the on-time control pulse, and may generate a mode signal indicating a difference between the reference voltage and the feedback voltage. The first sensing signal may indicate a level of the inductor current and the second sensing signal may indicate a zero level of the inductor current. The mode controller may select one of the first pulse signal and the second pulse signal as an output pulse signal according to the mode signal and an operation mode based on the on-time control pulse. The driving controller may generate the first driving control signal and the second driving control signal based on the output pulse signal. A level of the output voltage may be lower than a level of the input power supply voltage. The voltage converter may be a buck converter.

According to an exemplary embodiment, a power management device includes a reference voltage generator, a reset signal generator and a voltage converter. The reference voltage generator generates a reference voltage in response to a power enable signal. The reset signal generator generates a reset signal based on the power enable signal and the reference voltage. The voltage converter generates a driving control signal by performing a pulse-frequency modulation (PFM) and a pulse-width modulation (PWM) based on a feedback voltage and the reference voltage, and converts an input power supply voltage to an output voltage in response to the driving control signal. The feedback voltage is obtained by dividing the output voltage at an output node. The voltage converter includes a converting circuit, and a switching control circuit. The converting circuit includes an inductor connected to a switching node, a first switching device connected between the switching node and a common voltage and a second switching device connected between the switching node and an output node. The first switching device charges an input power supply voltage in the inductor and discharges the inductor in response to a driving control signal. The switching control circuit generates the driving control signal by performing the PWM and the PFM based on a first sensing signal, a second sensing signal and the feedback voltage. The first sensing signal and the second sensing signal are based on a sensed current flowing through the first switching device. The switching control circuit adjusts a charging time of the inductor on a time basis, based on at least the input voltage when the switching control circuit performs the PFM.

Accordingly, the voltage converter may adjust feed-forwardly a charging time of the inductor on a time basis and may perform mode transition based on on-time control pulse. Accordingly, the voltage converter may increase a stability and power transfer efficiency.

An exemplary embodiment power converter includes a converting circuit connected to an input node and having a switching node, an energy storage device connected to the switching node, and a plurality of switching devices connected to the switching node; and a switching control circuit connected to control inputs of the plurality of switching devices to control the plurality of switching devices by following one of a plurality of power transfer operating modes at a time based on at least one feedback signal, at least one feed-forward signal, and at least one sensing signal, and switching between the plurality of power transfer operating modes based on a current flowing substantially through an output node, wherein the at least one feedback signal is based on an output potential at the output node, the at least one feed-forward signal is based on an input potential at the input node, and the at least one sensing signal is based on a sensed current flowing substantially through at least one of the plurality of switching devices, and a first of the plurality of switching devices is connected between the switching node and a common node.

BRIEF DESCRIPTION OF THE DRAWINGS

Features will become apparent to those of ordinary skill in the art by describing in detail exemplary embodiments of the present inventive concept with reference to the attached drawings.

DETAILED DESCRIPTION

Figure 1:
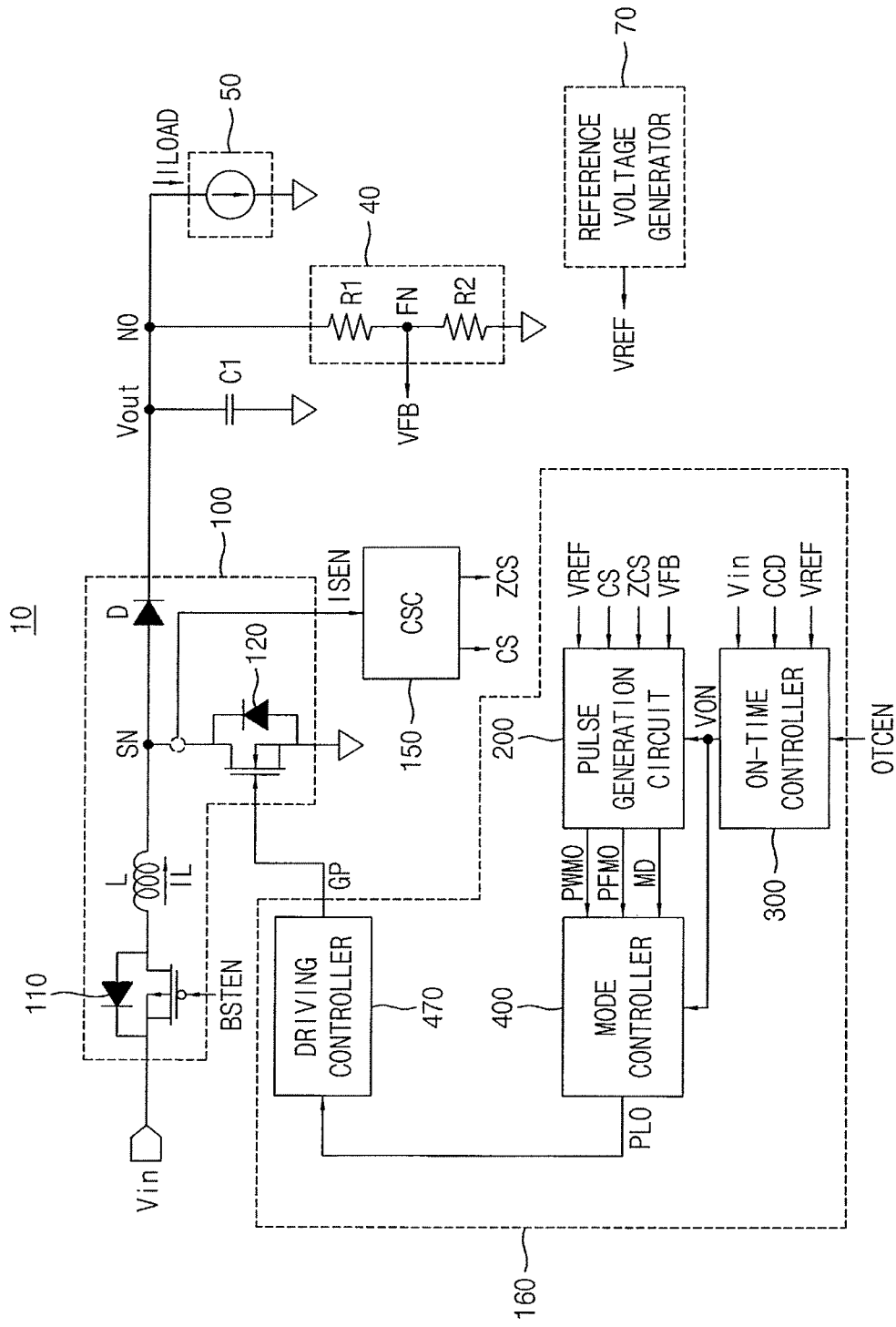
FIG. 1 is a block diagram illustrating a voltage converter according to an exemplary embodiment.

Exemplary embodiments of the present inventive concept provide a voltage converter with high transfer efficiency over a broad range of load currents that performs stable mode transition by switching modes, such as between pulse-width modulation and pulse-frequency modulation, based on accurate measurements of current flow across an energy storage device and/or a switching device during a window of time. Embodiments provide a switching mode power supply with feed-forward, feedback, and current sensing, that can stably transition between power transfer operating modes (e.g., PWM, PFM, boost, buck, hybrid) based on pulse on-times and current. The present inventive concept will be described more fully with reference to the accompanying drawings, in which exemplary embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals may refer to like elements throughout this application.

It will be understood that, although the terms first, second, or the like may be used herein to describe various elements, these elements should not be limited by these terms. These terms are used to distinguish one element from another. For example, a first element could be termed a second element, and, similarly, a second element could be termed a first element, without departing from the scope of the present disclosure. If an element is termed a third element, for example, a second element need not be present. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," or the like.).

The terminology used herein is for the purpose of describing particular embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by those of ordinary skill in the art to which this present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present inventive concept will be described in detail with reference to the accompanying drawings. Like reference numerals may be assigned to like elements, and the details thereof may be omitted in order to avoid redundancy.

FIG. 1 is a block diagram illustrating a voltage converter according to an exemplary embodiment.

Referring to FIG. 1, an exemplary embodiment voltage converter 10 includes a converting circuit 100 connected between an input node and an output node, a capacitor C1 connected between the output node and a common node, a feedback unit 40 connected between the output node and the common node, a reference voltage generator 70 generating a reference signal, a current sensing circuit 150 generating sensing signals, and a switching control circuit 160 receiving the reference and sensing signals. A load 50 is illustrated for convenience in FIG. 1, but the voltage converter 10 need not include the load 50. The voltage converter 10 may be referred to as a switching mode power supply (SMPS) or a power converter.

The converting circuit 100 includes an energy storage device such as an inductor L, a first switching device 120, a second switching device D and a third switching device 110. The first switching device 120 may include an n-channel power switch connected between a switching node SN and a common voltage node, and the second switching device D may include a diode. The third switching device 110 may be connected between an input power supply voltage Vin node and the inductor L, and may transfer the input power supply voltage Vin to the inductor L in response to a boosting control signal BSTEN provided from outside. The second switching device D may be connected between the switching node SN and an output node NO.

The smoothing capacitor C1 may be connected between the output node NO and the common voltage node. The feedback unit 40 is connected between the output node NO and the common voltage node, in parallel with the capacitor C1, and includes resistors R1 and R2 interconnected at a feedback node FN, which divides an output voltage Vout at the output node NO to provide a feedback voltage VFB. A load current ILOAD flows into the load 50 from the output node NO. The inductor L and the capacitor C1 may operate as a low-pass filter that removes ripples in the output voltage Vout. Alternately, equivalent circuits may be substituted using primarily inductors and/or primarily capacitors as the energy storage devices.

The first switching device 120 charges the inductor L with the input power supply voltage Vin in response to a driving control signal GP with a first logic level, and transfers the voltage charged in the inductor L to the output node NO in response to the driving control signal GP with a second logic level. The first switching device 120 includes an n-channel power switch that has a drain coupled to the switching node SN, a source coupled to the common voltage node and a gate receiving the driving control signal GP.

The second switching device D may include a diode that substantially prevents a current from flowing to the output node NO from the switching node SN.

The current sensing circuit 150 generates a first sensing signal CS indicating a non-zero peak or threshold level of a sensed current ISEN that flows through the first switching device 120 and generates a second sensing signal ZCS indicating a substantially zero level of the sensed current ISEN based on the sensed current ISEN. The reference voltage generator 70 generates a reference voltage VREF.

Figure 12:
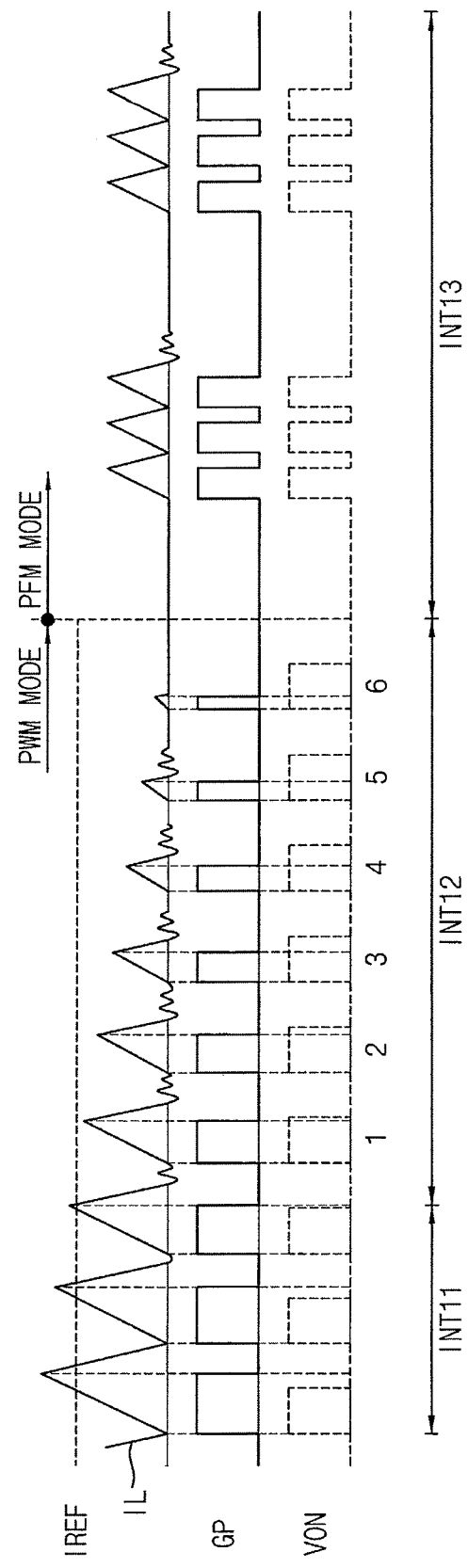
FIG. 12 illustrates mode transition according to a load in the voltage converter of FIG. 1 or FIG. 2.

As shown in FIGS. 1 and 12, the switching control circuit 160 generates the driving control signal GP by performing a pulse-frequency modulation (PFM) and a pulse-width modulation (PWM) based on the feedback voltage VFB, the reference voltage VREF, the first sensing signal CS and the second sensing signal ZCS. The switching control circuit 160 may adjust a charging time of the inductor L on a time basis based on at least the input power supply voltage Vin when the switching control circuit 160 performs the PFM. The switching control circuit 160 may adjust an activation interval of the driving control signal GP on a time basis based on at least the input power supply voltage Vin.

The reference voltage generator 70 generates the reference voltage VREF and provides the reference voltage VREF to the switching control circuit 160.

The switching control circuit 160 includes a pulse generation circuit 200, an on-time controller 300, a mode controller 400 and driving controller 470.

Figure 7:
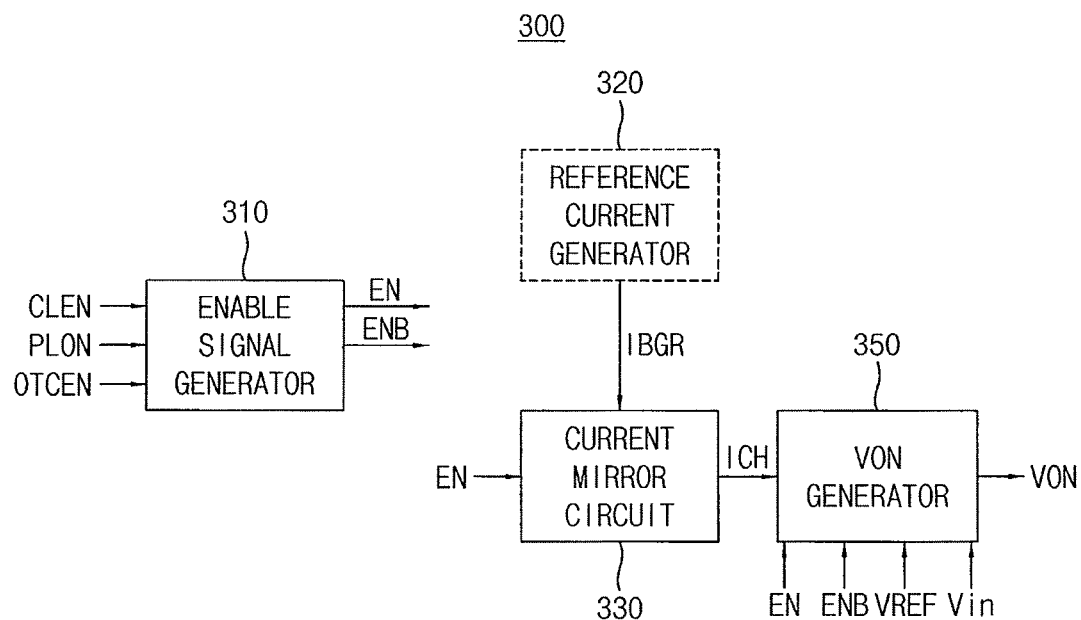
FIG. 7 is a block diagram illustrating the on-time controller in FIG. 1 or FIG. 2 according to an exemplary embodiment.
Figure 8:
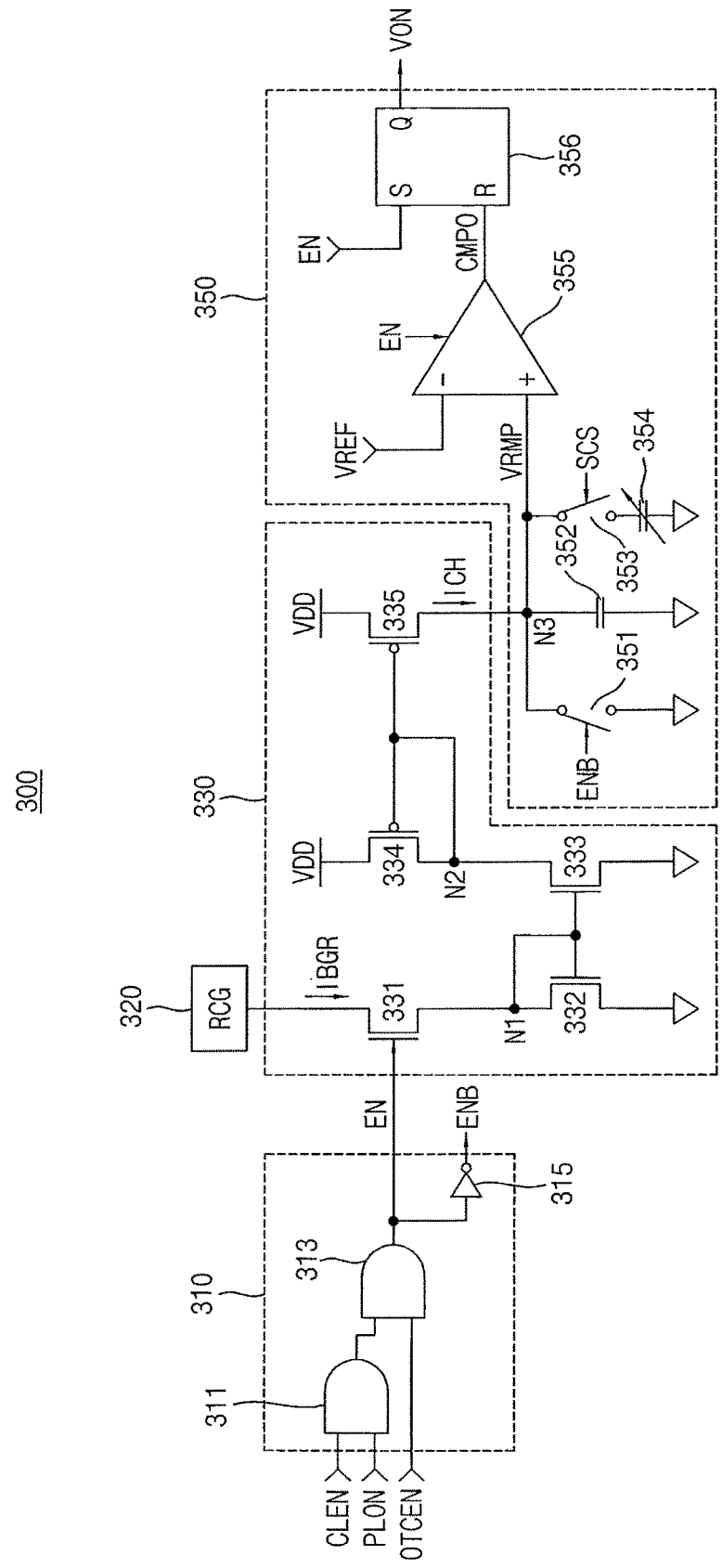
FIG. 8 is a circuit diagram illustrating the on-time controller in FIG. 1 according to an exemplary embodiment.

The on-time controller 300 of FIGS. 1, 7 and 8 generates an on-time control pulse VON that limits or adjusts the charging time of the inductor L based on the input power supply voltage Vin and the reference voltage VREF. The pulse generation circuit 200 of FIGS. 1 and 5 receives the VON signal and generates a first pulse signal PWMO by performing the PWM, and/or generates a second pulse signal PFMO by performing the PFM, based on the reference voltage VREF, the first sensing signal CS, the second sensing signal ZCS, the feedback voltage VFB and the on-time control pulse VON, and generates a mode signal MD based on a difference between the reference voltage VREF and the feedback voltage VFB. The on-time controller 300 may be activated in response to a controller enable signal OTCEN provided from outside. The on-time controller 300 may further receive a calibration code CCD.

The mode controller 400 selects one of the first pulse signal PWMO or the second pulse signal PFMO as an output pulse signal PLO according to an operation mode based on the mode signal MD and the on-time control pulse VON. The mode controller 400 selects one of the first pulse signal PWMO and the second pulse signal PFMO as the output pulse signal PLO based on comparing a first on-time and a second on-time. The first on-time may represent a first activation interval of the first pulse signal PWMO and the second on-time may represent a second activation interval of the second pulse signal PFMO. Alternatively, the first and second on-times may represent different activation intervals of the first pulse signal, or they may represent different activation intervals of the second pulse signal.

The driving controller 470 outputs the driving control signal GP based on the output pulse signal PLO. Thus, the switching control circuit 160 causes the voltage converter 10 to operate in a PWM mode, which may be more efficient for higher electrical loads, when the load generally remains above a threshold, and causes it to operate in a PFM mode, which may be more efficient for lower electrical loads, when the load generally remains below a threshold.

Figure 2:
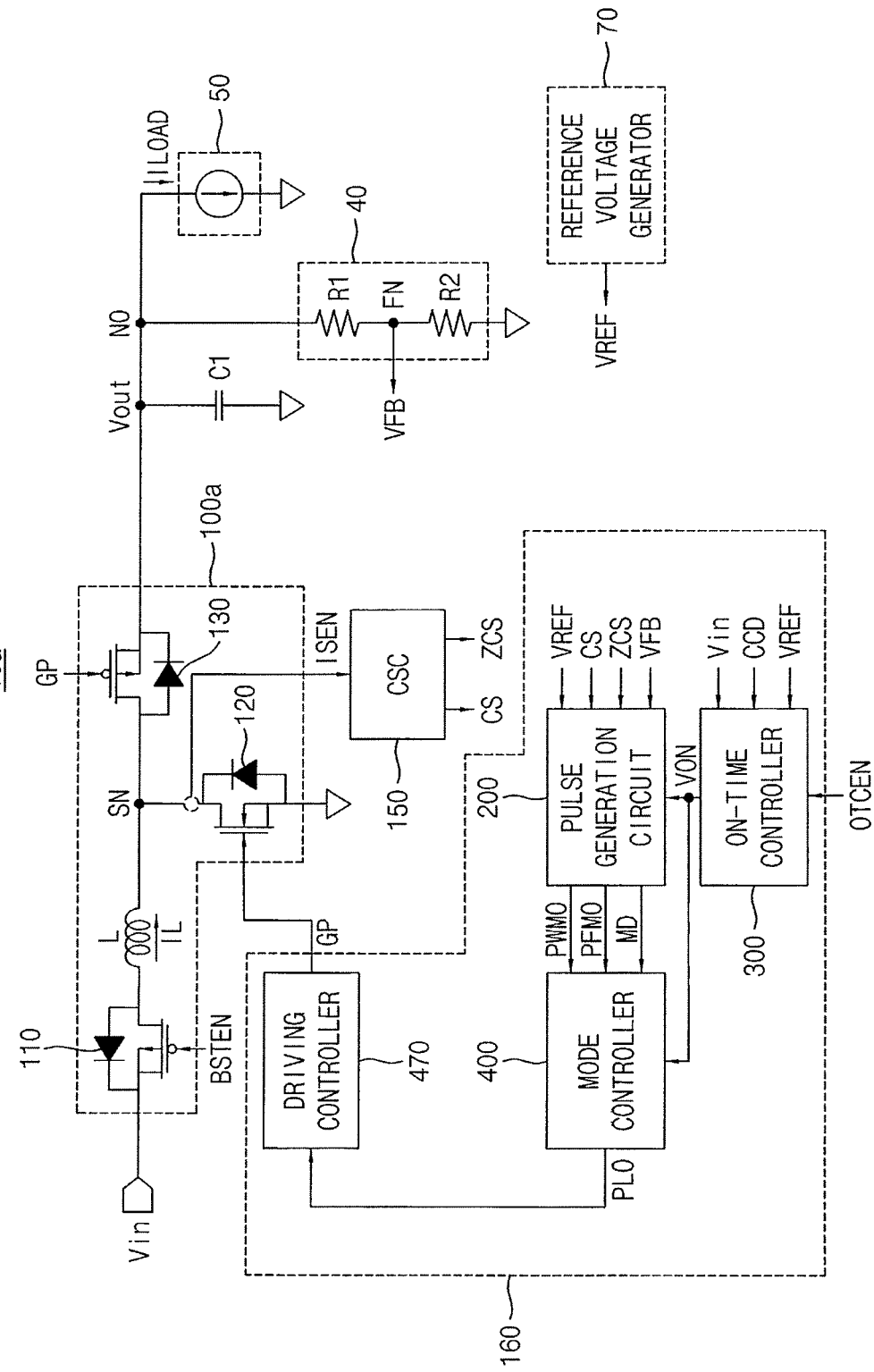
FIG. 2 is a block diagram illustrating a voltage converter according to an exemplary embodiment.

FIG. 2 is a block diagram illustrating a voltage converter according to an exemplary embodiment.

Referring to FIG. 2, a voltage converter 10a is similar to the voltage converter 10 of FIG. 1, so duplicate description may be omitted. The voltage converter 10a includes a converting circuit 100a, a capacitor C1, a feedback unit 40, a reference voltage generator 70, a current sensing circuit 150 and a switching control circuit 160.

The converting circuit 100a includes an inductor L, a first switching device 120, a second switching device 130 and a third switching device 110. The first switching device 120 may include an n-channel power switch connected between a switching node SN a common voltage and the second switching device 130 may include a p-channel power switch connected between the switching node SN and an output node NO. The third switching device 110 may be connected between an input power supply voltage Vin and the inductor L, and may transfer the input power supply voltage Vin to the inductor L in response to a boosting control signal BSTEN provided from outside. The second switching device 130 may be a p-channel power switch that has a source coupled to the switching node SN, a drain coupled to the output node NO and a gate receiving the driving control signal GP.

Therefore, the voltage converter 10 of FIG. 1 may be an asynchronous boost converter and the voltage converter 10a of FIG. 2 may be a synchronous boost converter. In either case, the switching control circuit 160 causes the voltage converter 10 or 10a to operate in a PFM mode, which is more efficient for lower current loads, when the load current remains below a threshold, and causes it to operate in a PWM mode, which is more efficient for higher current loads, when the load current remains above a threshold. In the synchronous configuration of the voltage converter 10a, the second switching device is a complimentary transistor with lower resistance from drain to source to further reduce losses and improve overall conversion efficiency, where both the first and second transistors are not turned on at the same time.

Figure 3A:
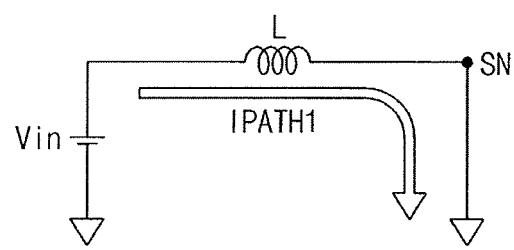
FIGS. 3A and 3B respectively illustrate an operation of the converting circuit in the voltage converter of FIG. 1 or FIG. 2.
Figure 3B:
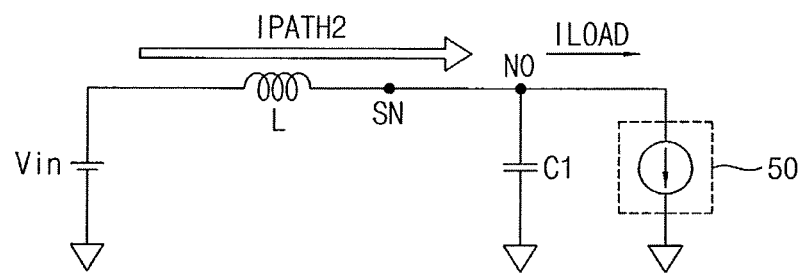

FIGS. 3A and 3B respectively illustrate an operation of the converting circuit in the voltage converter of FIG. 1 or FIG. 2.

Referring to FIGS. 1, 2 and 3A, when the first switching device 120 is turned-on in response to the driving control signal GP with a first logic level, the converting circuits 100 and 100a may charge the input power supply voltage Vin in the inductor L by performing a current build-up operation. When the converting circuits 100 and 100a perform the current build-up operation, a first current path IPATH1 is formed in the converting circuits 100 and 100a. In addition, when the converting circuits 100 and 100a perform the current build-up operation, an inductor current IL of the inductor L is substantially the same as the sensed current ISEN.

Referring to FIGS. 1, 2 and 3B, when the first switching device 120 is turned-off and the second switching device 130 is turned-on in response to the driving control signal GP with a second logic level, the converting circuits 100 and 100a may transfer the energy stored in the inductor L to the output node NO by performing a current transfer operation. When the converting circuits 100 and 100a perform the current transfer operation, a second current path IPATH2 is formed in the converting circuits 100 and 100a and the load current ILOAD is provided to the load 50.

Figure 4:
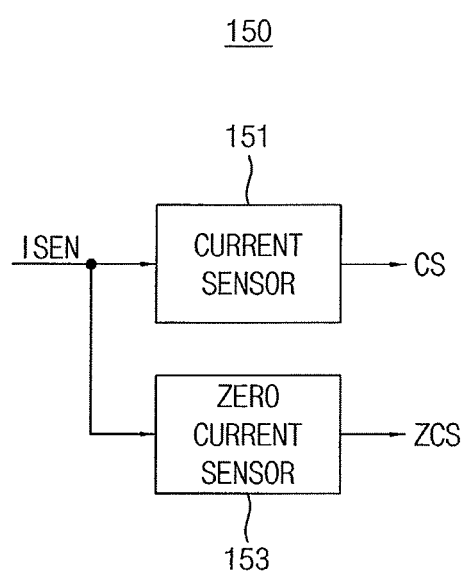
FIG. 4 is a block diagram illustrating the current sensing circuit in FIG. 1 or FIG. 2 according to an exemplary embodiment.

FIG. 4 is a block diagram illustrating the current sensing circuit in FIG. 1 or FIG. 2 according to an exemplary embodiment.

Referring to FIG. 4, the current sensing circuit 150 includes a current sensor 151 and a zero-current sensor 153. The current sensor 151 senses a non-zero peak or threshold level of the sensed current ISEN to output the first sensing signal CS. The zero-current sensor 153 senses a substantially zero-level of the sensed current ISEN to output the second sensing signal ZCS. The first sensing signal CS and the second sensing signal ZCS may be voltage signals substantially independent from each other due to different thresholds, for example.

Figure 5:
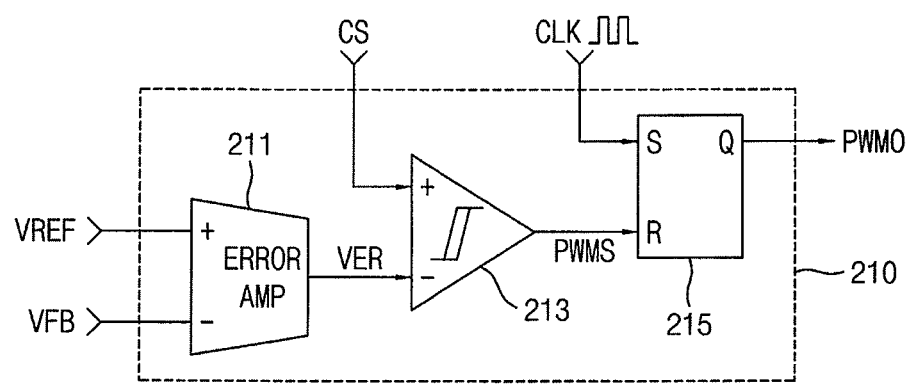
FIG. 5 is a block diagram illustrating the pulse generation circuit in FIG. 1 or FIG. 2 according to an exemplary embodiment.
Figure 5:
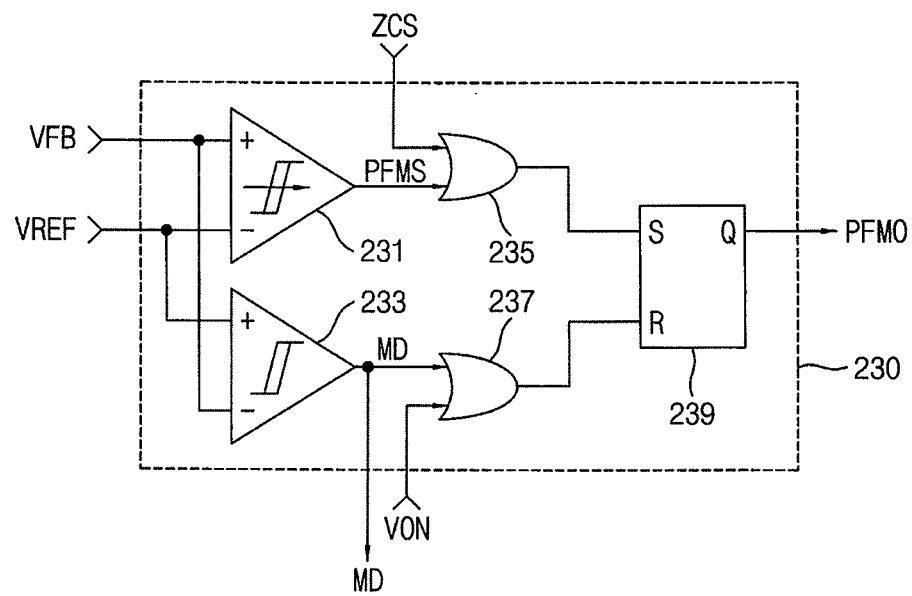

FIG. 5 is a block diagram illustrating the pulse generation circuit in FIG. 1 or FIG. 2 according to an exemplary embodiment.

Referring to FIG. 5, the pulse generation circuit 200 includes a first pulse generator 210 and a second pulse generator 230.

The first pulse generator 210 generates the first pulse signal PWMO based on the reference voltage VREF, the feedback voltage VFB, the first sensing signal CS, and a clock signal CLK. The second pulse generator 230 generates the second pulse signal PFMO based on the reference voltage VREF, the feedback voltage VFB, the second sensing signal ZCS, and the on-time control signal VON.

The first pulse generator 210 includes an error amplifier 211, a hysteresis comparator 213 and an RS flip-flop 215. The error amplifier 211 amplifies a difference of the reference voltage VREF and the feedback voltage VFB to output an error voltage VER. The hysteresis comparator 213 compares the first sensing signal CS and the error voltage VER to output a PWM signal PWMS indicating a difference between the first sensing signal CS and the error voltage VER. The RS flip-flop 215 includes a set terminal S receiving clock signal CLK having a predetermined frequency, a reset terminal R receiving the PWM signal PWMS and an output terminal Q providing the first pulse signal PWMO. Therefore, the first pulse signal PWMO is set in response to a rising edge of the clock signal CLK and is reset in response to a rising edge of the PWM signal PWMS.

The second pulse generator 230 includes a first hysteresis comparator 231, a second hysteresis comparator 233, a first OR gate 235, a second OR gate 237 and an RS flip-flop 239.

The first hysteresis comparator 231 compares the feedback voltage VFB and the reference voltage VREF to output a PFM signal PFMS corresponding to a difference between the feedback voltage VFB and the reference voltage VREF. The first hysteresis comparator 231 may have a variable hysteresis window. The second hysteresis comparator 233 compares the reference voltage VREF and the feedback voltage VFB to output the mode signal MD corresponding to a difference between the reference voltage VREF and the feedback voltage VFB. The first OR gate 235 performs an OR operation on the PFM signal PFMS and the second sensing signal ZCS. The second OR gate 237 performs an OR operation on the mode signal MD and the on-time control pulse VON. The RS flip-flop 239 includes a set terminal S receiving an output of the first OR gate 235, a reset terminal R receiving an output of the second OR gate 237 and an output terminal Q providing the second pulse signal PFMO. Therefore, the second pulse signal PFMO is set in response to a rising edge of the second sensing signal ZCS or a rising edge of the PFM signal PFMS and is reset in response to a rising edge of the mode signal MD or a rising edge of the on-time control pulse VON.

Figure 6:
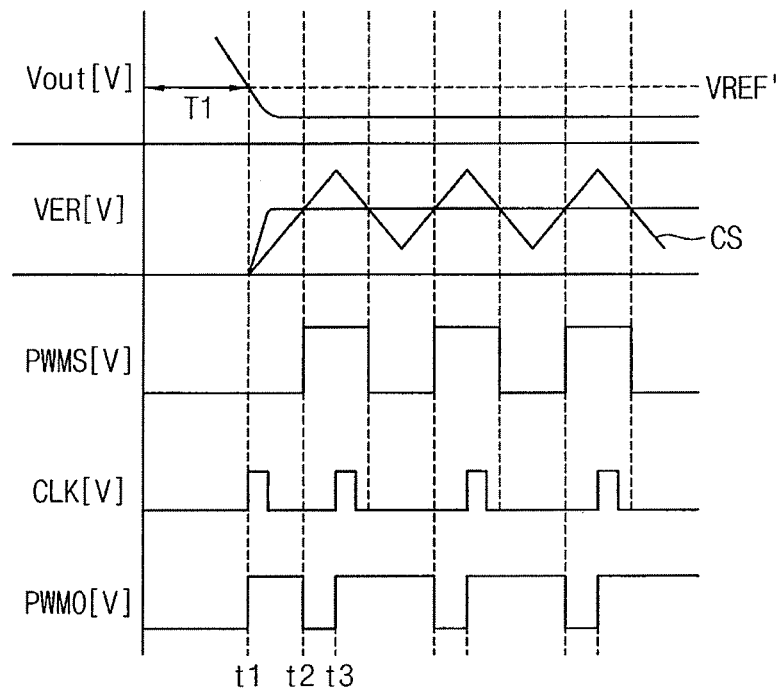
FIG. 6 is a timing diagram illustrating various signals in the first pulse generator in FIG. 5.

FIG. 6 is a timing diagram illustrating various signals in the first pulse generator of FIG. 5.

In FIG. 6, VREF' represents an electric potential of the output voltage Vout in a case where the feedback voltage VFB is the same as the reference voltage VREF.

While the output voltage Vout is lower than the VREF', which corresponds to the reference voltage VREF, namely, during period T1, the error voltage VER is at a low level. During the period T1, the first pulse signal PWMO is likewise at a low level.

As a result, the output voltage Vout gradually decreases, and the feedback node FN decreases accordingly during the period T1. When the output voltage Vout becomes equal to or lower than VREF', the error voltage VER changes from the low level to a high level. Since the level of the first sensing signal CS is lower than a level of the error voltage VER between timings t1 and t2, the hysteresis comparator 213 outputs the PWM signal PWMS with a low level. Since the level of the first sensing signal CS is higher than the level of the error voltage VER between timings t2 and t3, the hysteresis comparator 213 outputs the PWM signal PWMS with a high level and the clock signal CLK transitions to a high level at a timing t3. Therefore, the first pulse signal PWMO is set in response to a rising edge of the clock signal CLK at the timing t1, is reset in response to a rising edge of the PWM signal PWMS at the timing t2 and is set in response to a rising edge of the clock signal CLK at the timing t3.

FIG. 7 is a block diagram illustrating the on-time controller in FIG. 1 or FIG. 2 according to an exemplary embodiment.

FIG. 8 is a circuit diagram illustrating the on-time controller in FIG. 1 according to an exemplary embodiment.

Referring to FIGS. 7 and 8, the on-time controller 300 includes an enable signal generator 310, a current mirror circuit 330 and an on-time pulse generator 350. In addition, the on-time controller 300 may further include a reference current generator 320. The reference current generator 320 may generate a reference current IBGR to the current mirror circuit 330.

The enable signal generator 310 generates a first enable signal EN and a second enable signal ENB based on control signals CLEN and OTCEN and a reference pulse signal PLON. The control signals CLEN and OTCEN may be provided from an outside. The first enable signal EN and the second enable signal ENB may be complementary to each other. The current mirror circuit 330 generates a charging current ICH by mirroring the reference current IBGR based on the first enable signal EN. The on-time pulse generator 350 generates the on-time control pulse VON based on the first enable signal EN, the second enable signal ENB, the charging current ICH, the reference voltage VREF and the input power supply voltage Vin.

The enable signal generator 310 includes a first AND gate 311, a second AND gate 313 and an inverter 315. The first AND gate 311 performs an AND operation on the calibration enable signal CLEN and the reference pulse signal PLON. The second AND gate 313 performs an AND operation on an output of the first AND gate 311 and the controller enable signal OTCEN directing an activation of the on-time controller to output the first enable signal EN. The inverter 315 inverts the first enable signal EN to output the second enable signal ENB.

The current mirror circuit 330 includes n-channel metal-oxide semiconductor (NMOS) transistors 331, 332 and 333 and p-channel metal-oxide semiconductor (PMOS) transistors 334 and 335.

The NMOS transistor 331 has a drain receiving the reference current IBGR, a gate receiving the first enable signal EN and a source coupled to a node N1. The NMOS transistor 332 has a drain coupled to the node N1, a gate coupled to the node N1 and a source coupled to the common voltage. The NMOS transistor 333 has a drain coupled to a node N2, a gate coupled to the node N1 and a source coupled to the common voltage.

The PMOS transistor 334 has a source coupled to a power supply voltage VDD, a gate coupled to the node N2 and a drain coupled to the node N2. The PMOS transistor 335 has a source coupled to the power supply voltage VDD, a gate coupled to the node N2 and a drain providing the charging current ICH. The drain of the PMOS transistor 335 is coupled to the in-time pulse generator 350 at a node N3.

The NMOS transistors 331, 332 and 333 may constitute a first current mirror, and the NMOS transistor 333 and the PMOS transistors 334 and 335 may constitute a second current mirror. Therefore, the charging current ICH, provided at the node N3, may have a same magnitude as the reference current ICH or may have a greater magnitude than the reference current ICH based on sizes of the NMOS transistors 331, 332 and 333 and the PMOS transistors 334 and 335.

The on-time pulse generator 350 includes a first switch 351, a first capacitor 352, a second switch 353, a second capacitor 354, a comparator 355 and an RS flip-flop 356.

The first switch 351 is coupled between the node N3 and the common voltage, and the first switch 351 discharges voltage stored in the first and second capacitors 352 and 354 or sinks a current that remains in the current mirror circuit 330 in response to the second enable signal ENB. The first capacitor 352 is coupled between the node N3 and the common voltage in parallel with the first switch 351, and the first capacitor 352 stores a voltage corresponding to the charging current ICH. The second switch 353 and the second capacitor 354 are connected in series between the node N3 and the common voltage. A plurality of the second switch 353 and the second capacitor 354 may be connected between the node N3 and the common voltage, the second capacitor 354 may store one of the input power supply voltage Vin and a voltage corresponding to the calibration code CCD and the second switch 354 provides the voltage stored in the second capacitor 354 to the node N3 in response to a switching control signal SCS provided from an outside.

The comparator 355 is activated in response to the first enable signal EN, compares a ramp voltage VRMP at the node N3 with the reference voltage VREF and provides an output signal CMPO corresponding to a difference between the ramp voltage VRMP and the reference voltage VREF. Therefore, a level of the ramp voltage VRMP increases according to level of the voltages stored in the first and second capacitors 352 and 354, and the output signal CMPO arrives at the reference voltage VREF more quickly as the level of the ramp voltage VRMP increases. In addition, since the level of the ramp voltage VRMP is associated with at least the level of the input power supply voltage Vin, the speed at which the output signal CMPO arrives at the reference voltage VREF is associated with at least the level of the input power supply voltage Vin.

The RS flip-flop 356 has a set terminal S receiving the first enable signal EN, a reset terminal R receiving the output CMPO of the comparator 355 and an output terminal Q providing the on-time control pulse VON. Therefore, the on-time control pulse VON is set in response to a rising edge of the first enable signal EN, and is reset in response to a rising edge of the output signal CMPO. Since the speed at which the output signal CMPO arrives at the reference voltage VREF is associated with at least the level of the input power supply voltage Vin, on-time, the activation interval of the on-time control pulse VON, is associated with the input power supply voltage Vin. Therefore, the on-time controller 300 may feed-forwardly adjust the charging time of the inductor L based on the input power supply voltage Vin on a time basis.

Figure 9A:
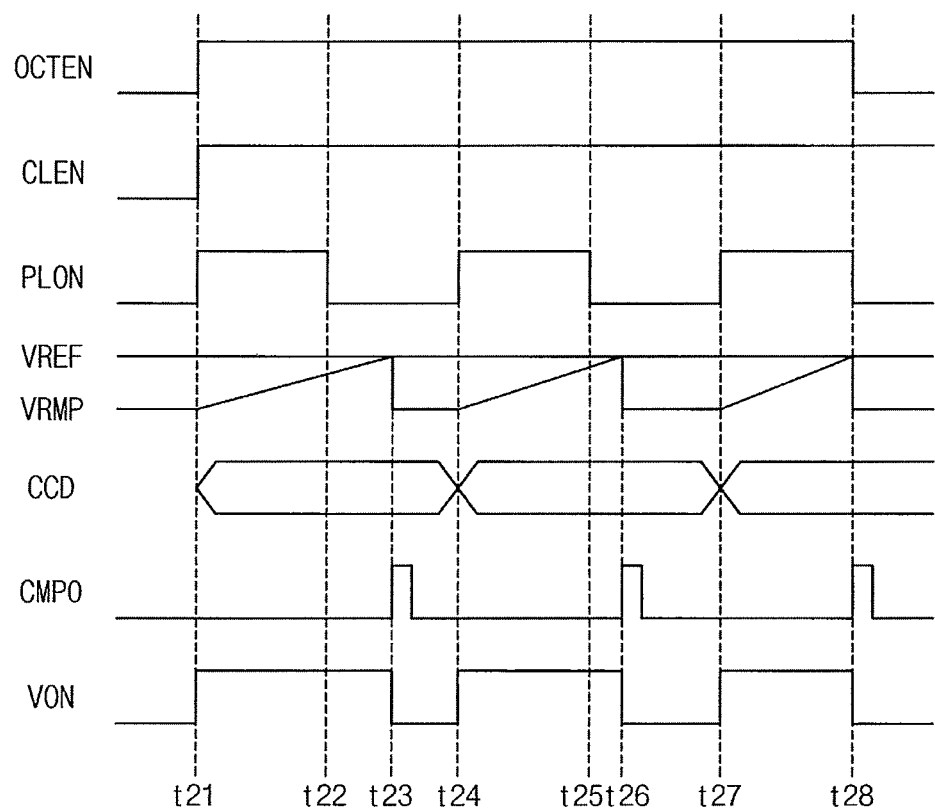
FIG. 9A is a timing diagram illustrating an operation of the on-time controller of FIG. 8.

FIG. 9A is a timing diagram illustrating an operation of the on-time controller 300 of FIG. 8.

Referring to FIGS. 8 and 9, since the controller enable signal OTCEN and the calibration enable signal CLEN are enabled between timings t21~t28 and the reference pulse signal PLON is enabled respectively between timings t21~t22, t24~t25 and t27~t28, activation intervals of the first enable signal EN are same as the reference pulse signal PLON.

Since the level of the ramp voltage VRMP is substantially the same as the level of the reference voltage VREF respectively at timings t23, t26 and t28, the output signal CMPO is enabled during a short interval respectively at timings t23, t26 and t28. When the calibration code CCD is input, the level of the ramp voltage VRMP gradually increases respectively from timings t21, t24 and t27. Therefore, the on-time control pulse VON is set or enabled in response to a rising edge of the first enable signal EN, and is reset or disabled in response to a rising edge of the output signal CMPO.

Figure 9B:
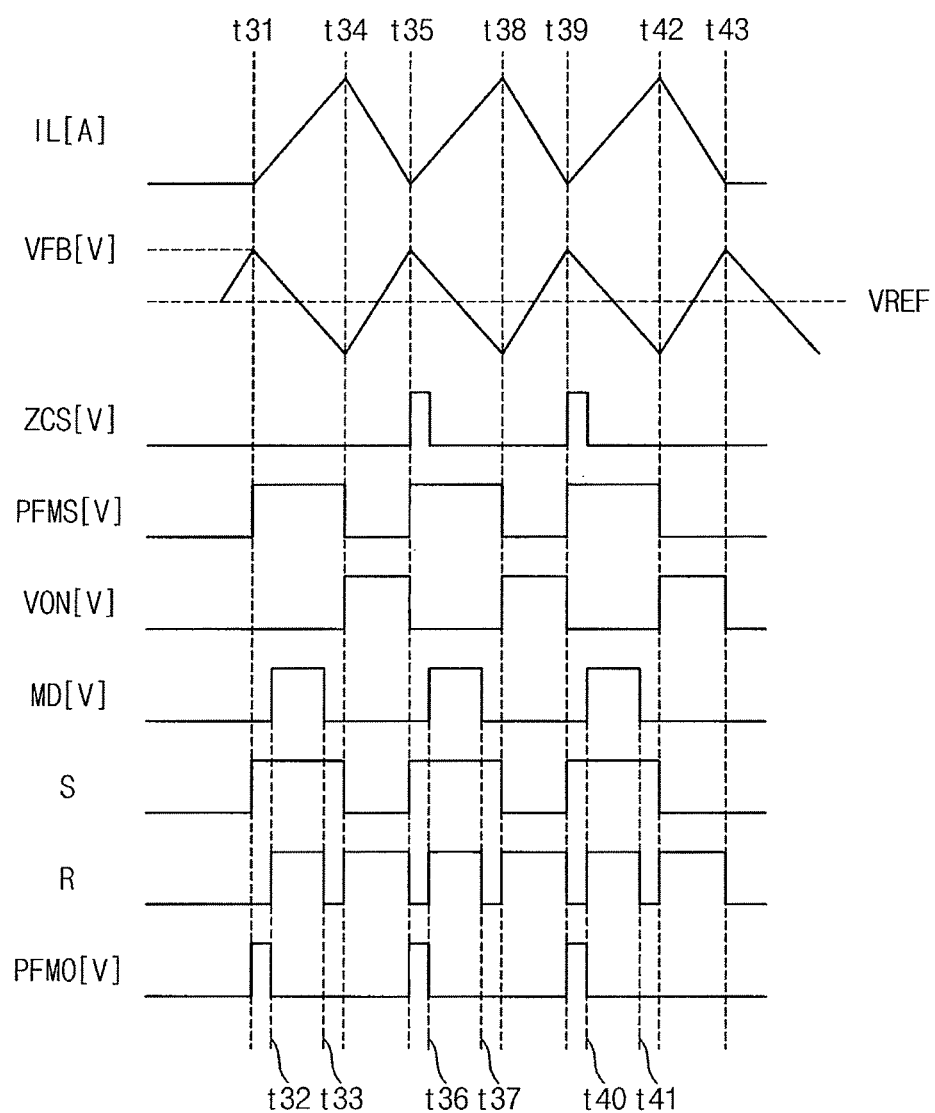
FIG. 9B is a timing diagram illustrating an operation of the second pulse generator in the pulse generation circuit of FIG. 5.

FIG. 9B is a timing diagram illustrating an operation of the second pulse generator 230 in the pulse generation circuit of FIG. 5.

Referring to FIGS. 5, 9A and 9B, the level of the feedback voltage VFB increases respectively between timings t31~t34, t35~t38 and t39~t42, and the level of the feedback voltage VFB decreases respectively between timings t34~t35, t38~t39, and t42~t43. Since the level of the inductor current IL is substantially zero-level respectively at timings t35 and t39, the second sensing signal ZCS is activated during short intervals between timings t35~t36, and between timings t39~t40. The PFM signal PFMS, which is the output of the first hysteresis comparator 231 of FIG. 5, is activated respectively between timings t31~t34, t35~t38, and t39-'t42, and the mode signal MD, which is the output of the second hysteresis comparator 233 of FIG. 5, is activated respectively between timings t32~33, t36~t37, and t40~t41, based on a difference between the feedback voltage VFB and the reference voltage VREF.

The on-time control pulse VON is activated respectively between timings t34~t35, t38~39, and t42~43. Therefore, the output S of the first OR gate 235 is activated respectively between timings t31~t34, t35~t38 and t39~t42, and the output R of the second OR gate 237 235 is activated respectively between timings t32~t33, t34~t35, t36~t37, t38~t39, t40~t41, and t42~t43. Accordingly, the second pulse signal PFMO is activated in response to a rising edge of the output of the first OR gate 235 and is deactivated in response to a rising edge of the output of the second OR gate 237. That is, the second pulse signal HMO is activated respectively between timings t31~32, t35~36 and t39~t40.

Figure 10:
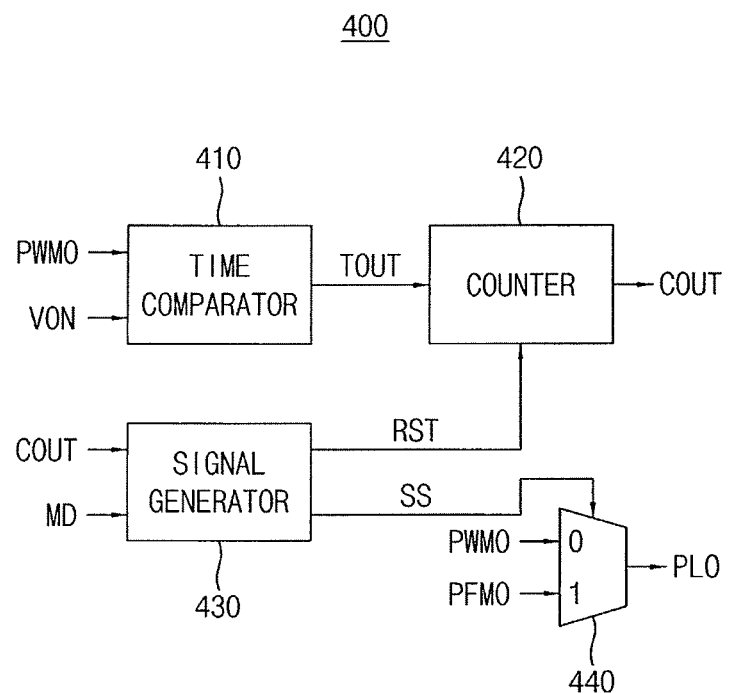
FIG. 10 is a block diagram illustrating the mode controller in the voltage converter of FIG. 1 or FIG. 2 according to an exemplary embodiment.

FIG. 10 is a block diagram illustrating the mode controller in the voltage converter of FIG. 1 or FIG. 2 according to an exemplary embodiment.

Referring to FIG. 10, the mode controller 400 includes a time comparator 410, a counter 420, a signal generator 430 and a selection circuit 440.

The time comparator 410 compares a first on-time corresponding to a first activation interval of the first pulse signal PWMO and a second on-time corresponding to a second activation interval of the on-time control pulse VON to output a time comparison signal TOUT. The time comparator 410 outputs the time comparison signal TOUT at a first logic level when the first on-time is smaller than the second on-time. When the time comparison signal TOUT has a first logic level, the counter 420 counts the time comparison signal TOUT and outputs a counting output signal COUT. The counter 420 outputs the counting output signal COUT at a first logic level when the time comparison signal TOUT has a first logic level consecutively by a reference number of times, such as during a short-term period.

The signal generator 430 generates a reset signal RST and a selection signal SS based on the counting output signal COUT and the mode signal MD. The signal generator 430 provides the reset signal RST to the counter, and provides the selection signal SS to the selection circuit 440. The signal generator 430 outputs the selection signal SS at a first logic level when the mode signal MD has a first logic level and the counting output signal COUT has a first logic level. The signal generator 430 outputs the reset signal RST to the counter 420 to reset the counter 420 in response to the counting output signal COUT at a first logic level.

The selection circuit 440 selects one of the first pulse signal PWMO and the second pulse signal PFMO as the output pulse signal PLO in response to the selection signal SS. The selection circuit 440 selects the second pulse signal PFMO as the output pulse signal PLO when the mode signal MD has a first logic level and the counting output signal COUT has a first logic level.

Figure 11:
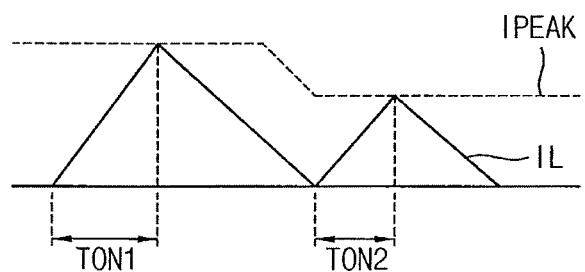
FIG. 11 illustrates that the voltage converter of FIG. 1 or FIG. 2 adjusts an on-time in the PFM mode.

FIG. 11 illustrates that the voltage converter of FIG. 1 or FIG. 2 adjusts an on-time in the PFM mode.

Referring to FIG. 11, the on-time controller 300 of FIG. 1, 2, 7, or 8 may adaptively adjust an on-time of the driving control signal GP in the PFM mode according to a peak level IPEAK of the inductor current IL based on the input power supply voltage Vin. The on-time controller 300 adjusts the on-time of the driving control signal GP to an on-time TON1 when the peak level of the inductor current IL is high, and adjusts the on-time of the driving control signal GP to an on-time TON2 when the peak level of the inductor current IL is low.

Thus, according to an exemplary embodiment of the present inventive concept, the charging time for the inductor current is adjusted on a time basis using a feed-forward configuration.

FIG. 12 illustrates a mode transition according to a reduced load in the voltage converter of FIG. 1 or FIG. 2.

Referring to FIG. 12, the voltage converter 10 of FIG. 1 or 10a of FIG. 2 operates in a PWM mode during a first interval INT11 and a second interval INT12 and operates in a PFM mode during a third interval INT13. During the first interval, an on-time of the driving control signal GP is greater than the on-time of the on-time control signal VON. During the second interval INT12, the on-time of the driving control signal GP is smaller than the on-time of the on-time control signal VON.

The counter 420, of the mode controller 400 of FIG. 10, counts the number of times that the on-time of the driving control signal GP is smaller than the on-time of the on-time control signal VON, and outputs the counting output signal COUT at a first logic level when the counted number of times reaches or exceeds the reference number of times. The voltage converter 10 of FIG. 1 or 10a of FIG. 2 operates in a PFM mode, as during the third interval INT13, when the counting output signal COUT has a first logic level and the mode signal MD has a first logic level.

Figure 13:
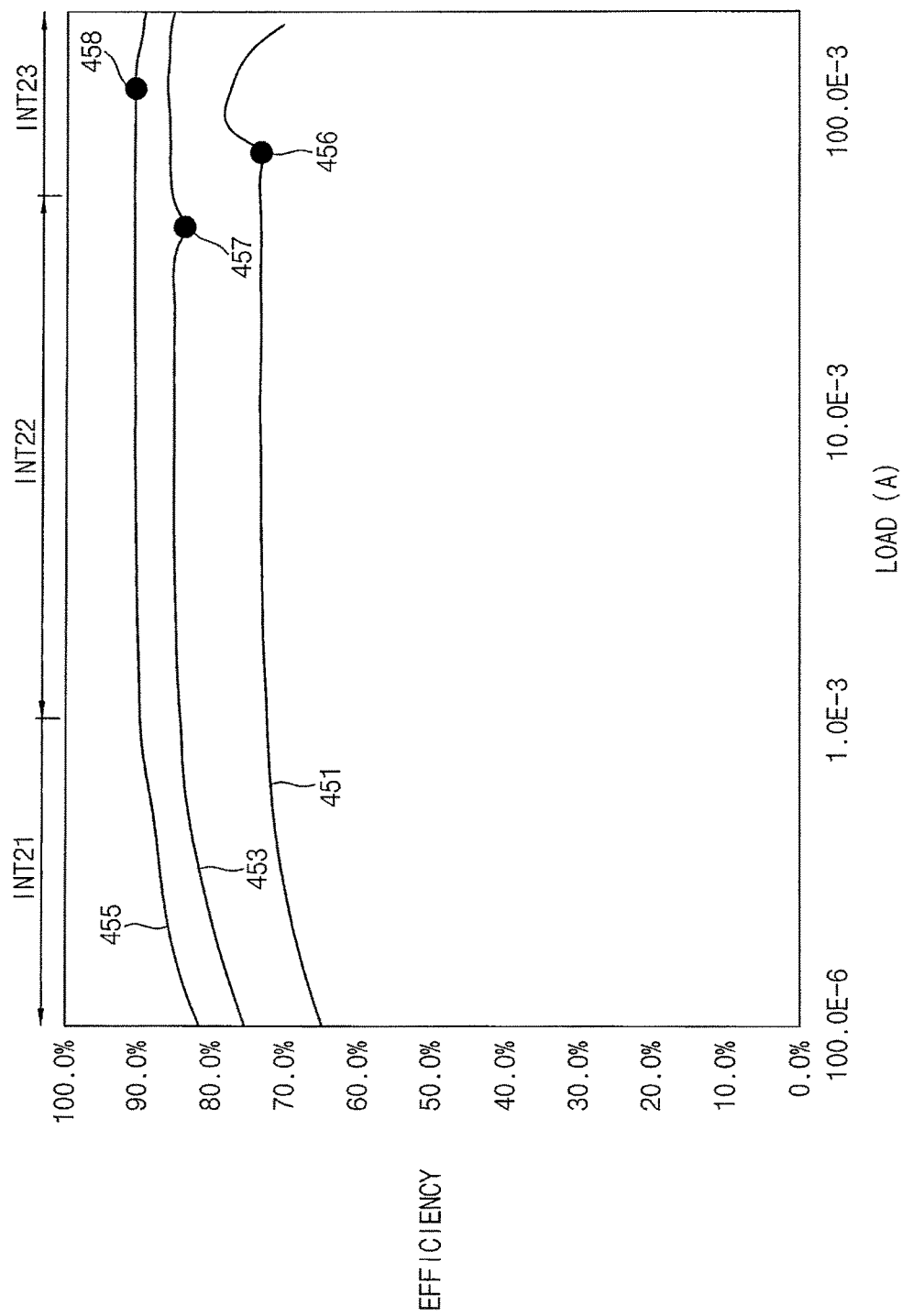
FIG. 13 illustrates a power transfer efficiency of the voltage converter of FIG. 1 or FIG. 2.

FIG. 13 illustrates a power transfer efficiency of the voltage converter of FIG. 1 and/or FIG. 2.

In FIG. 13, during an interval INT21, the load current ILOAD delivered to the load 50 is very small, during an interval INT22, the load current ILOAD delivered to the load 50 is small, and during an interval INT23, the load current ILOAD delivered to the load 50 is great. In addition, a reference numeral 451 represents a case when the input power supply voltage Vin is boosted to the output voltage with 3.3 [V] without the full benefit of exemplary embodiments, a reference numeral 453 represents a case when the input power supply voltage Vin is boosted to the output voltage with 3.3 [V] while an exemplary embodiment is employed, and a reference numeral 455 represents a case when the input power supply voltage Vin is boosted to the output voltage with 5.5 [V] while an exemplary embodiment is employed. In addition, reference numerals 456, 457 and 458 indicate mode transitions from the PFM mode to the PWM mode in the voltage converter as the load current ILOAD increases.

Referring to FIG. 13, it is noted that power transfer efficiency in both of the PFM mode and the PWM mode in the voltage converter 10 of FIG. 1 or 10a of FIG. 2 is enhanced.

Figure 14:
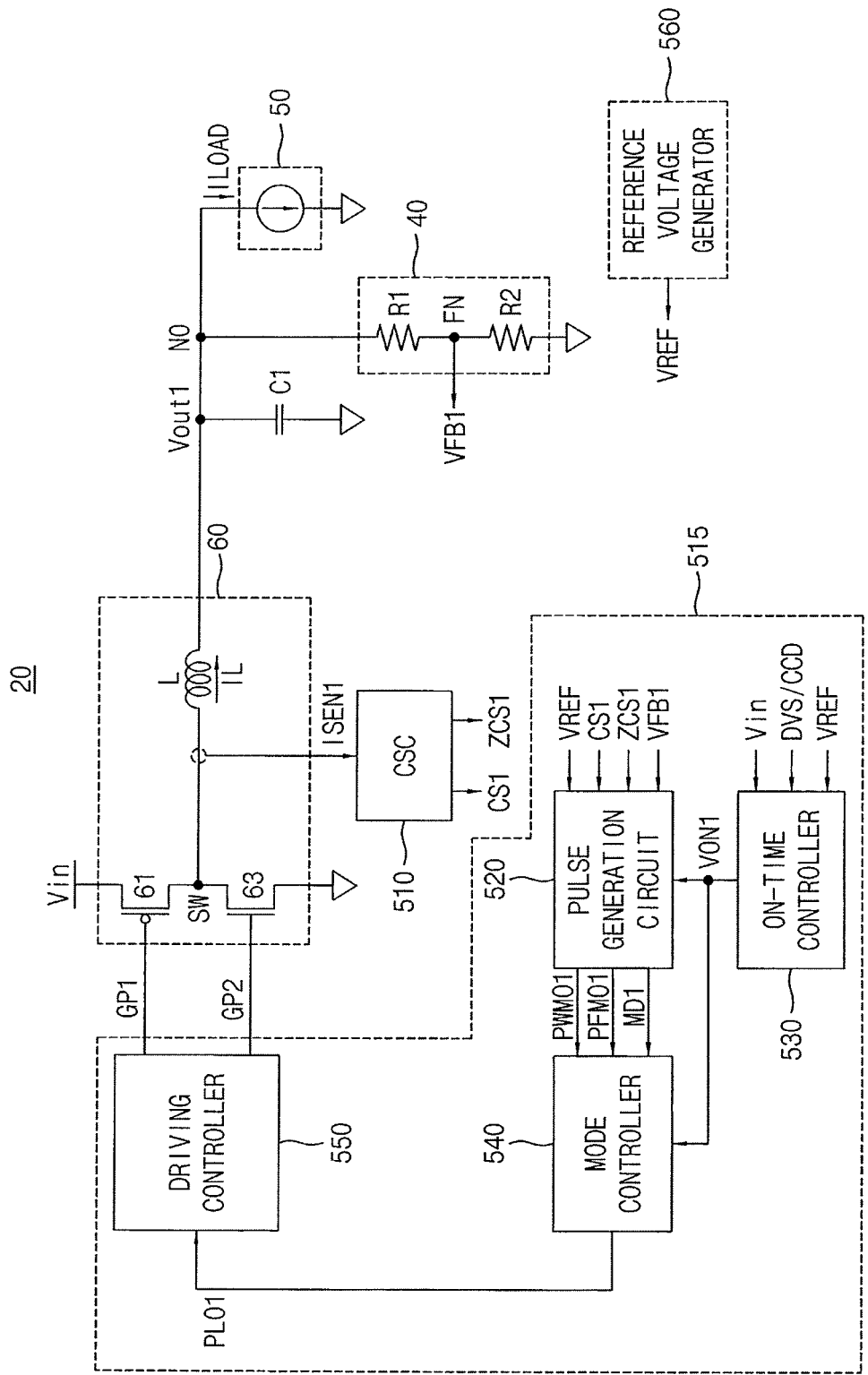
FIG. 14 is a block diagram illustrating a voltage converter according to an exemplary embodiment.

FIG. 14 is a block diagram illustrating a voltage converter according to an exemplary embodiment.

Referring to FIG. 14, a voltage converter 20 includes a converting circuit 60, a capacitor C1, a feedback unit 40, a reference voltage generator 560, a current sensing circuit 510 and a switching control circuit 515. A load 50 is illustrated for convenience in FIG. 14, and the voltage converter 20 need not include the load 50. The voltage converter 20 may also be referred to as a switching mode power supply (SMPS) or a power converter.

The converting circuit 60 includes a first switching device 61, a second switching device 63 and an inductor L. The inductor L is connected between the switching node SN and an output node NO. The first switching device 61 is connected between the input power supply voltage Vin and the switching node SN and charges the input power supply voltage Vin in the inductor L in response to a first driving control signal GP1. The second switching device 63 is connected between the switching node SN and the common voltage and discharges the inductor L in response to a second driving control signal GP2.

The first switching device 61 may include a PMOS transistor that has a source coupled to the input power supply voltage Vin, a gate receiving the first driving control signal GP1 and a drain coupled to the switching node SN. The second switching device 63 may include an NMOS transistor that has a drain coupled to the switching node SN, a gate receiving the second driving control signal GP2 and a source coupled to the common voltage. The first and the second driving control signals GP1 and GP2 have a same logic level.

The smoothing capacitor C1 is connected between the output node NO and the common voltage. The feedback unit 40 is connected between the output node NO and the common voltage in parallel with the capacitor C1, includes resistors R1 and R2 connected at a feedback node FN, and divides an output voltage Vout1 at the output node NO to provide a feedback voltage VFB1. A load current ILOAD flows into the load 50 from the output node NO. The inductor L and the capacitor C1 operate as a low-pass filter that removes ripples in the output voltage Vout1.

The current sensing circuit 510 generates a first sensing signal CS1 indicating a level of a sensed current ISEN1 that flows through the inductor L and generates a second sensing signal ZCS1 indicating a zero level of the sensed current ISEN1 based on the sensed current ISEN1. The reference voltage generator 560 generates a reference voltage VREF.

The switching control circuit 515 generates the first and the second driving control signals GP1 and GP2 by performing a PFM and a PWM based on the feedback voltage VFB1, the reference voltage VREF, the first sensing signal CS1 and the second sensing signal ZCS1. The switching control circuit 515 may adjust a charging time of the inductor L on a time basis based on at least the input power supply voltage Vin when the switching control circuit 515 performs the PFM. The switching control circuit 515 may adjust a low-activation interval of the first driving control signal GP1 on a time basis based on at least the input power supply voltage Vin.

The switching control circuit 515 includes a pulse generation circuit 525, an on-time controller 530, a mode controller 540 and driving controller 550.

The on-time controller 530 generates an on-time control pulse VON1 that adjusts (or limits) the charging time of the inductor L based on the input power supply voltage Vin and the reference voltage VREF. The pulse generation circuit 520 generates a first pulse signal PWMO1 by performing the PWM, generates a second pulse signal PFMO1 by performing the PFM, based on the reference voltage VREF, the first sensing signal CS1, the second sensing signal ZCS1, the feedback voltage VFB1 and the on-time control pulse VON1, and generates a mode signal MD1 indicating a difference between the reference voltage VREF and the feedback voltage VFB1. The on-time controller 530 may be activated in response to a controller enable signal OTCEN provided from an outside. The on-time controller 530 may receive a calibration code CCD.

The mode controller 540 selects one of the first pulse signal PWMO1 and the second pulse signal PFMO1 as an output pulse signal PLO1 according to an operation mode based on the mode signal MD1 and the on-time control pulse VON1. The mode controller 540 selects one of the first pulse signal PWMO1 and the second pulse signal PFMO1 as the output pulse signal PLO1 based on comparing a first on-time and a second on-time. The first on-time may represent a first activation interval of the first pulse signal PWMO1 and the second on-time may represent a second activation interval of the second pulse signal PFMO1.

The driving controller 550 outputs the first and second driving control signals GP1 and GP2 respectively to the first switching device 61 and the second switching device 63 based on the output pulse signal PLO1.

Figure 15A:
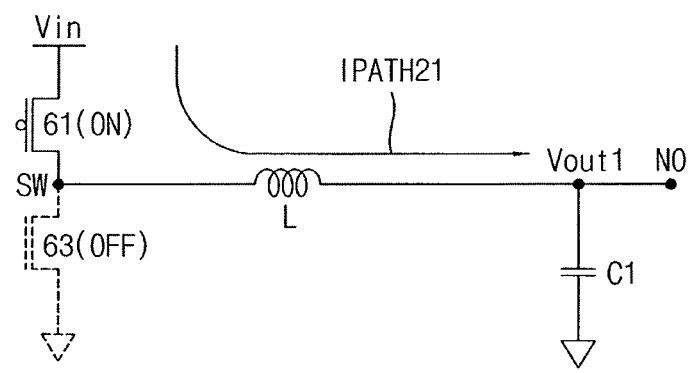
FIGS. 15A and 15B respectively illustrate an operation of the converting circuit in the voltage converter of FIG. 14.
Figure 15B:
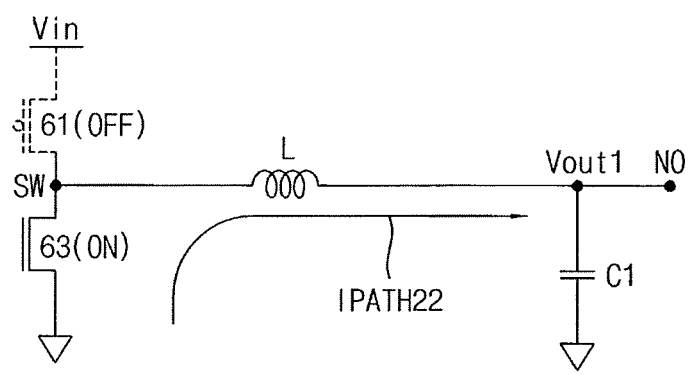

FIGS. 15A and 15B respectively illustrate an operation of the converting circuit in the voltage converter of FIG. 14.

Referring to FIGS. 14 and 15A, when the first switching device 61 is turned-on in response to the first driving control signal GP1 with a second logic level and the second switching device 63 is turned-off in response to the second driving control signal GP2 with a second logic level, the converting circuit 60 may charge the input power supply voltage Vin in the inductor L by performing a current build-up operation.

When the converting circuit 60 perform the current build-up operation, a first current path IPATH21 is formed in the converting circuit 60.

Referring to FIGS. 14 and 15B, when the first switching device 61 is turned-off in response to the first driving control signal GP1 with a first logic level and the second switching device 63 is turned-on in response to the second driving control signal GP2 with a first logic level, the converting circuit 60 may transfer the energy stored in the inductor L to the output node NO by performing a current transfer operation. When the converting circuit 60 perform the current transfer operation, a second current path IPATH22 is formed in the converting circuit 60 and the load current ILOAD is provided to the load 50.

The voltage converter 20 of FIG. 14 converts the input power supply voltage Vin to the output voltage Vout and a level of the output voltage Vout is lower than a level of the input power supply voltage Vin. Therefore, the voltage converter 20 of FIG. 14 may be a type of buck converter.

Operation of the voltage converter 20 of FIG. 14 is similar with operation of the voltage converters 10a and 10b of FIGS. 1 and 2 with reference to FIGS. 1 through 13, detailed description on the operation of the voltage converter 20 of FIG. 14 will be omitted.

Figure 16:
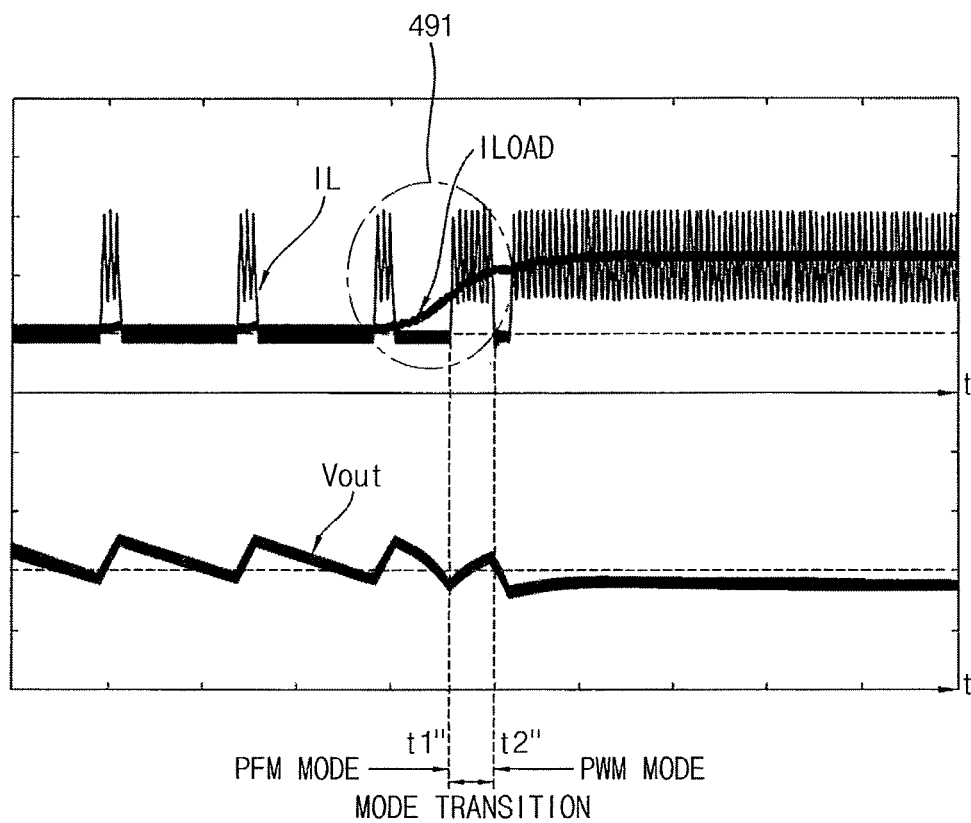
FIG. 16 is a graph explaining an operation of the voltage converter of FIG. 14
Figure 17:
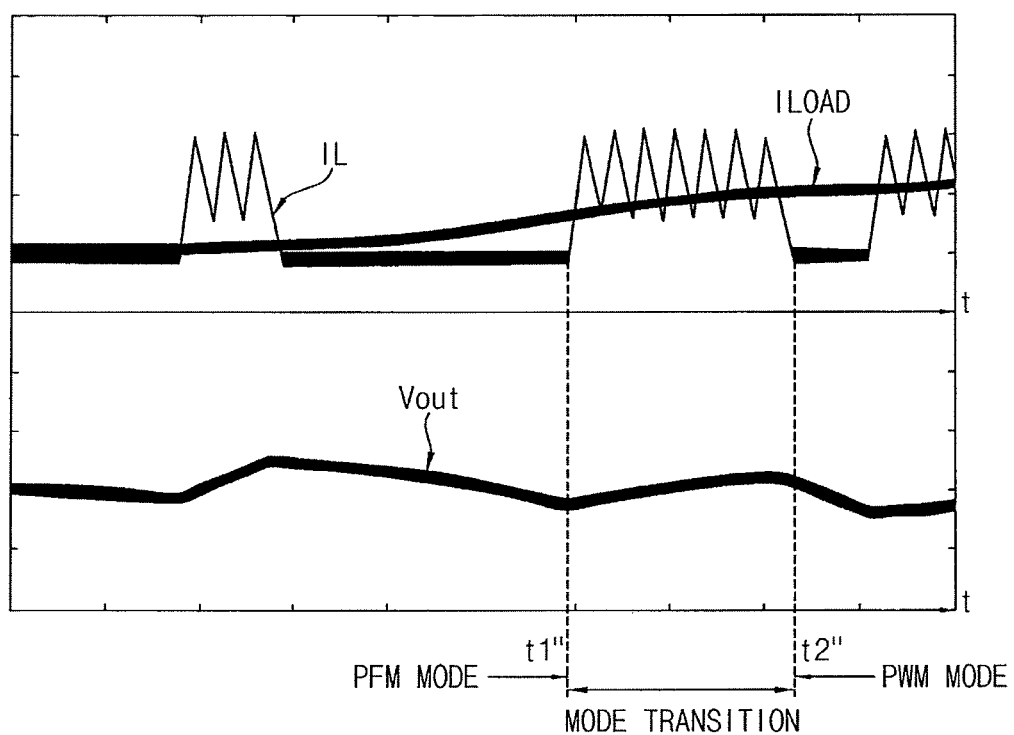
FIG. 17 is a graph which enlarges a portion of FIG. 16.

FIG. 16 is a graph explaining an operation of the voltage converter of FIG. 14 and FIG. 17 is a graph which enlarges a portion of FIG. 16.

Referring to FIGS. 16 and 17, since the level of the load current ILOAD is lower than the reference level at an initial stage of an operation of the voltage converter 20, that is, the level of the output voltage Vout1 is greater than the reference level, the voltage converter 20 operates in the PFM mode. In the PFM mode before timing t1", the voltage converter 20 may increase an efficiency of power transferred to the load 50 in the PFM mode by adjusting feed-forwardly the charging time of the inductor L in the switching control circuit 515 based on at least the input power supply voltage Vin on a time basis. When the load current ILOAD begins to increase and the level of the load current ILOAD approaches at the reference level between timings t1"~t2", the operation mode of the voltage converter 20 transits from the PFM mode to the PWM mode.

The level of the load current ILOAD is greater than the reference level between timings t1"~t2" and the voltage converter 20 operates in the PWM mode after timing t2". It is noted that the power is transferred to the load 50 with a higher efficiency than a case when the inductor current IL reaches its zero value because an average value of the inductor current IL is transferred to the load 50 in a mode transition interval 491 in FIG. 17.

Figure 18:
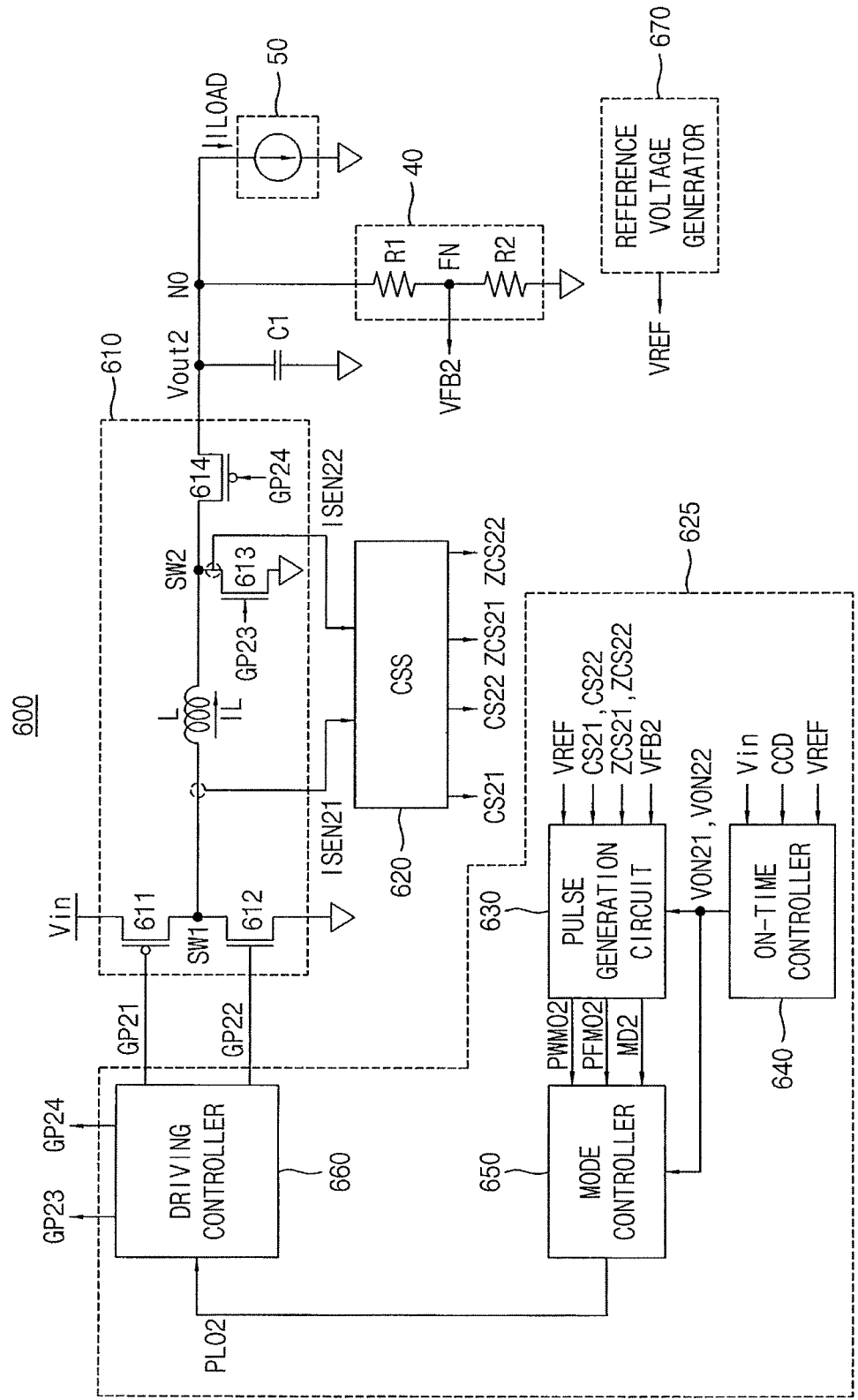
FIG. 18 is a block diagram illustrating a voltage converter according to an exemplary embodiment.

FIG. 18 is a block diagram illustrating a voltage converter according to an exemplary embodiment.

Referring to FIG. 18, a voltage converter 600 includes a converting circuit 610, a capacitor C1, a feedback unit 40, a reference voltage generator 670, a current sensing circuit 620 and a switching control circuit 625. A load 50 is illustrated for convenience in FIG. 18, but the voltage converter 600 need not include the load 50. The voltage converter 600 may be referred to as a switching mode power supply (SMPS) or a power converter.

The converting circuit 610 includes an inductor L, a first switching device 611, a second switching device 612, a third switching device 613 and a fourth switching device 614. The inductor L is connected between a first switching node SW1 and a second switching node SW2. The first switching device 611 is connected between the input power supply voltage Vin and the first switching node SW1 and charges the input power supply voltage Vin in the inductor L in response to a first driving control signal GP21 in a buck mode. The second switching device 612 is connected between the first switching node SW1 and the common voltage and discharges the inductor L in response to a second driving control signal GP22 in the buck mode.

The third switching device 613 is connected between the second switching node SW2 and the common voltage and charges the input power supply voltage Vin in the inductor IL in response to a third driving control signal GP23 in a boost mode. The fourth switching device 614 is connected between the second switching node SW2 and the output node NO and discharges the inductor L in response to a fourth driving control signal GP24 in the boost mode.

The first switching device 611 may include a PMOS transistor that has a source coupled to the input power supply voltage Vin, a gate receiving the first driving control signal GP21 and a drain coupled to the first switching node SW1. The second switching device 612 may include an NMOS transistor that has a drain coupled to the first switching node SW1, a gate receiving the second driving control signal GP22 and a source coupled to the common voltage. The third switching device 613 may include an NMOS transistor that has a drain coupled to the second switching node SW2, a gate receiving the third driving control signal GP23 and a source coupled to the common voltage. The fourth switching device 614 may include a PMOS transistor that has a source coupled to the second switching node SW2, a gate receiving the fourth driving control signal GP24 and a drain coupled to the output node NO.

The smoothing capacitor C1 is connected between the output node NO and the common voltage. The feedback unit 40 is connected between the output node NO and the common voltage in parallel with the capacitor C1, includes resistors R1 and R2 connected at a feedback node FN, and divides an output voltage Vout2 at the output node NO to provide a feedback voltage VFB2. A load current ILOAD flows into the load 50 from the output node NO. The inductor L and the capacitor C1 operate as a low-pass filter that removes ripples in the output voltage Vout2.

The converting circuit 610 generates the output voltage Vout2 by lowering the input power supply voltage Vin in the buck mode, 610 generates the output voltage Vout2 by boosting the input power supply voltage Vin in the boost mode and generates the output voltage Vout2 by lowering or boosting the input power supply voltage Vin in the buck-boost mode.

A level of the output voltage Vout2 is lower than a level of the input power supply voltage Vin in the buck mode, the level of the output voltage Vout2 is higher than the level of the input power supply voltage Vin in the boost mode, and the level of the output voltage Vout2 may be generally similar to the level of the input power supply voltage Vin in the buck-boost mode.

The fourth switching device 614 is turned-on, the third switching device 613 is turned-off and the first and second switching devices 611 and 612 are alternatively turned-on in the buck mode. The first and third switching devices 611 and 613 are alternatively turned-on and the second and fourth switching devices 612 and 614 are alternatively turned-on in the buck-boost mode. The first switching device 611 is turned-on, the second switching device 612 is turned-off and the third and fourth switching devices 613 and 614 are alternatively turned-on in the boost mode.

The current sensing circuit 620 generates a first sensing signal CS21 indicating a peak or non-zero level of a first sensed current ISEN21 that flows through the inductor L, generates a second sensing signal ZCS21 indicating a substantially zero level of the first sensed current ISEN21 based on the sensed current ISEN21, generates a third sensing signal CS22 indicating a peak or non-zero level of a second sensed current ISEN22 that flows through the third switching device 613 and generates a fourth sensing signal ZCS22 indicating a substantially zero level of the second sensed current ISEN22 based on the second sensed current ISEN22.

The switching control circuit 625 generates the first through fourth driving control signals GP21~GP24 by performing a PFM and a PWM based on the feedback voltage VFB2, the reference voltage VREF, the first through fourth sensing signals CS21, ZCS21, CS22 and ZCS22. The switching control circuit 625 may adjust a charging time of the inductor L on a time basis based on at least the input power supply voltage Vin when the switching control circuit 625 performs the PFM. The switching control circuit 625 may adjust a low-activation interval of the first driving control signal GP21 on a time basis in the buck mode and may adjust an activation interval of the third driving control signal GP23 on a time basis in the boost mode based on at least the input power supply voltage Vin.

The switching control circuit 625 includes a pulse generation circuit 630, an on-time controller 640, a mode controller 650 and driving controller 660.

The on-time controller 640 generates on-time control pulses VON21 and VON22 that adjust (or limit) the charging time of the inductor L based on the input power supply voltage Vin and the reference voltage VREF. The pulse generation circuit 630 generates a first pulse signal PWMO2 by performing the PWM, generates a second pulse signal PFMO2 by performing the PFM, based on the reference voltage VREF, the first sensing signal CS21, the second sensing signal ZCS21, the third sensing signal CS22, the fourth sensing signal ZCS22, the feedback voltage VFB2 and the on-time control pulses VON21 and VON22, and generates a mode signal MD2 indicating a difference between the reference voltage VREF and the feedback voltage VFB2. The on-time controller 640 may receive a calibration code CCD.

The mode controller 650 selects one of the first pulse signal PWMO1 and the second pulse signal PFMO1 as an output pulse signal PLO1 according to an operation mode based on the mode signal MD1 and the on-time control pulses VON1 and VON2. The mode controller 650 selects one of the first pulse signal PWMO2 and the second pulse signal PFMO2 as the output pulse signal PLO2 based on comparing a first on-time of an activation interval of the first pulse signal PWMO2 and a second on-time of an activation interval of the on-time control pulse VON21 in the buck mode. The mode controller 650 selects one of the first pulse signal PWMO2 and the second pulse signal PFMO2 as the output pulse signal PLO2 based on comparing the first on-time of an activation interval of the first pulse signal PWMO2 and a second on-time of an activation interval of the on-time control pulse VON22 in the boost mode.

The driving controller 660 outputs the first through fourth driving control signals GP21~GP24 respectively to the first through fourth switching devices 611~614 according to an operation mode based on the output pulse signal PLO2.

Figure 19:
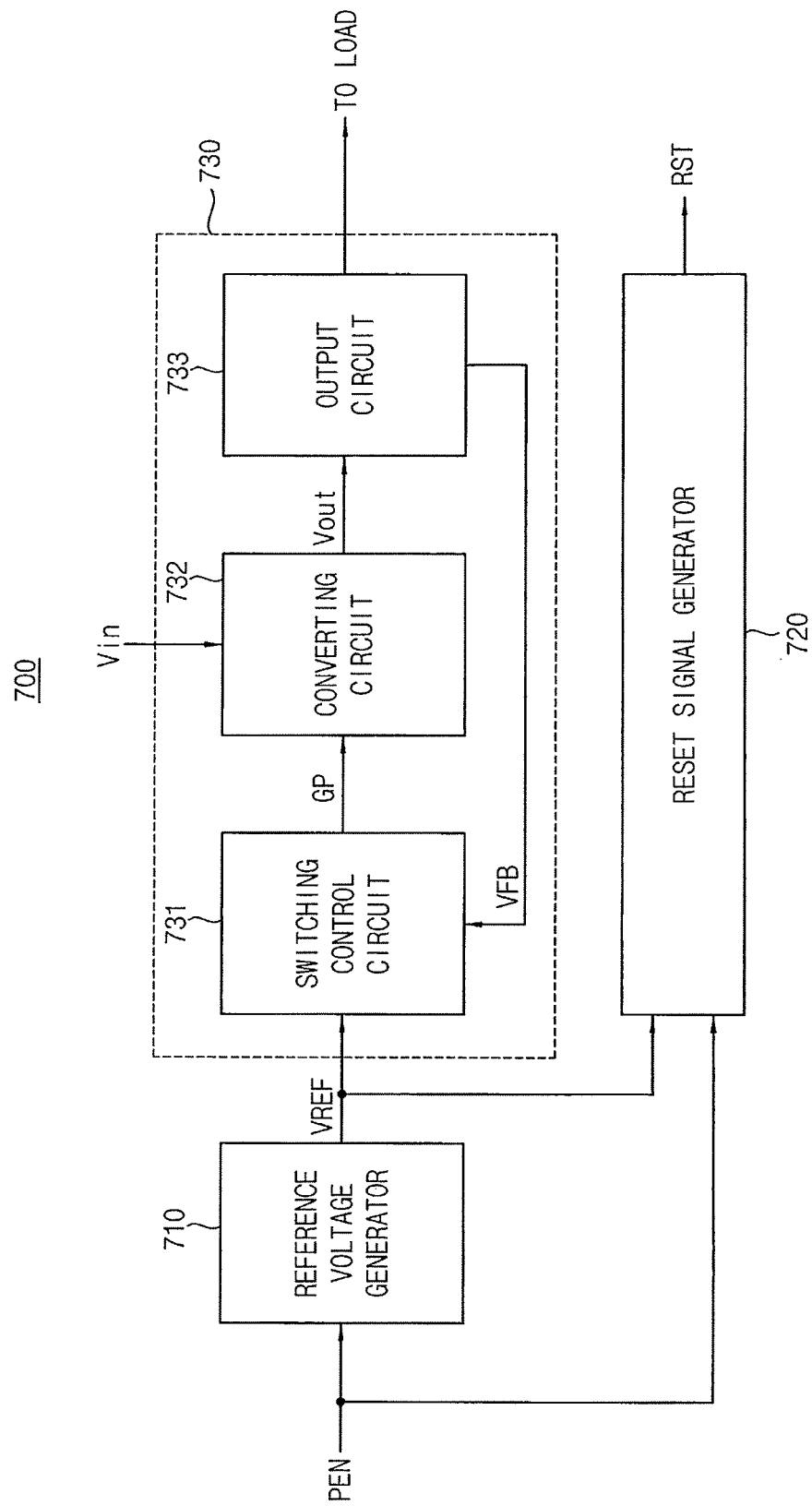
FIG. 19 is a block diagram illustrating a power management device according to an exemplary embodiment.

Operation of the voltage converter 600 in the boost mode is similar to operation of the voltage converters 10 and 10a with reference to FIGS. 1 through 13, and operation of the voltage converter 600 in the buck mode is similar to operation of the voltage converter 20 with reference to FIGS. 14 through 17:

FIG. 19 is a block diagram illustrating a power management device according to an exemplary embodiment.

Referring to FIG. 19, a power management device 700 includes a reference voltage generator 710, a reset signal generator 720 and a voltage converter 730. The reference voltage generator 710 generates a reference voltage VREF based on a power enable signal PEN. Although not illustrated in FIG. 19, the reference voltage generator 710 may be implemented with resistors used as a voltage divider for generating the first reference voltage VREF. In case a more stable reference voltage is desired, the reference voltage generator 710 may be implemented with a band-gap reference voltage circuit. The band-gap reference voltage circuit can provide a stable reference voltage that is insensitive to a temperature variation. The band-gap reference voltage circuit may include a start-up circuit, at least one transistor, at least one resistor, or the like.

The reset signal generator 720 generates a reset signal RST based on the power enable signal PEN and the reference voltage VREF. Although not illustrated in FIG. 19, the reset signal generator 720 may include a reset enable unit, a reset disable unit and a latch unit. The reset enable unit generates a reset enable signal based on the power enable signal PEN. The reset disable unit generates a reset disable signal based on the first reference voltage VREF and the reset enable signal. The latch unit generates the reset signal RST based on the reset enable signal and the reset disable signal.

The voltage converter 730 may employ one of the voltage converter 10 of FIG. 1, the voltage converter 10a of FIG. 2, the voltage converter 20 of FIG. 14 and the voltage converter 600 of FIG. 18.

The voltage converter 730 includes a switching control circuit 731, a converting circuit 732 and an output circuit 733. The switching control circuit 731 generates at least one driving control signal GP which drives the converting circuit 732, and the converting circuit 732 converts an input power supply voltage Vin to an output voltage Vout in response to the at least one driving control signal GP. The output circuit 733 may include the capacitor C1 and the feedback unit 40 of FIG. 1, and may provide a load current to a load based on the output voltage Vout. Therefore, the switching control circuit 731 generates the at least one driving control signal GP by performing a PWM and a PFM based on an inductor current flowing through an inductor in the converting circuit 732 and the feedback voltage VFB, adjusts feed-forwardly the charging time of the inductor based on the input power supply voltage Vin on a time basis when the switching control circuit 731 performs the PFM, and performs a mode transition based on an on-time control pulse. Accordingly, the voltage converter 730 may increase stability by performing the mode transition stably and may increase power transfer efficiency.

Figure 20:
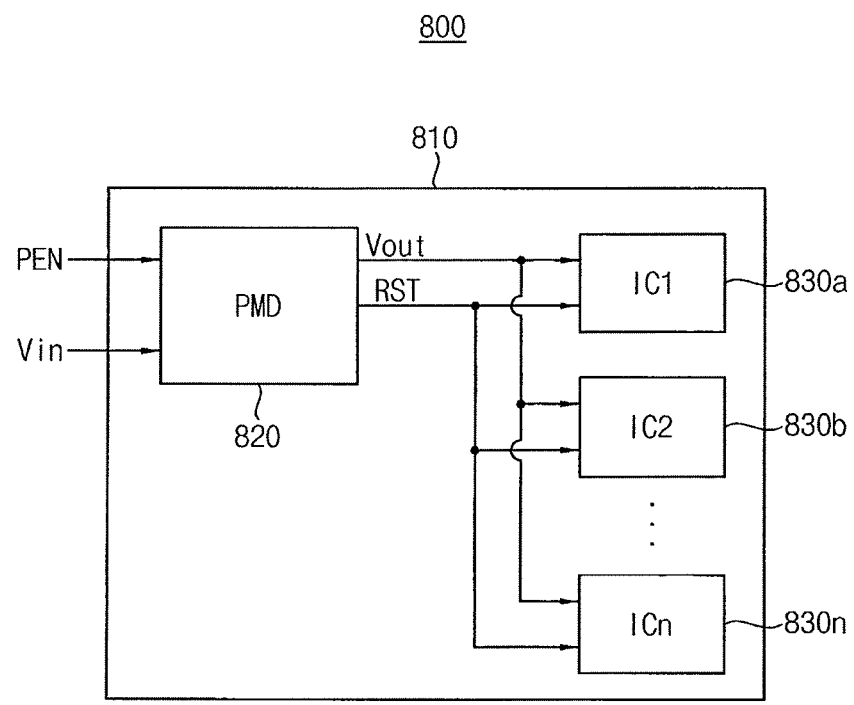
FIG. 20 is a block diagram illustrating a power management system according to an exemplary embodiment.

FIG. 20 is a block diagram illustrating a power management system according to an exemplary embodiment.

Referring to FIG. 20, a power management system 800 includes a power management device 820 and multiple integrated circuits 830a, 830b, . . . , 830n. The power management device 820 and the multiple integrated circuits 830a, 830b, . . . , 830n may be formed on a printed circuit board (PCB) 810.

The power management device 820 may be the power management device 700 shown in FIG. 19, for example. The power management device 820 generates an output voltage Vout based on the input power supply voltage Vin and generates a reset signal RST based on a power enable signal PEN.

The voltage converter may employ one of the voltage converter 10 of FIG. 1, the voltage converter 10a of FIG. 2. the voltage converter 20 of FIG. 14 and the voltage converter 600 of FIG. 18.

Therefore, the voltage converter generates the at least one driving control signal by performing a PWM and a PFM based on an inductor current flowing through an inductor and the feedback voltage, adjusts feed-forwardly the charging time of the inductor based on the input power supply voltage Vin on a time basis when performing the PFM, and performs a mode transition based on an on-time control pulse. Accordingly, the voltage converter may increase a stability by performing the mode transition stably and may increase power transfer efficiency.

The integrated circuits 830a, 830b, ..., 830n maintain a reset state based on the reset signal RST until the output power supply voltage Vout reaches a steady-state. After the output voltage Vout reaches the steady-state, the integrated circuits 830a, 830b, ..., 830n are ready to operate and are driven based on the output voltage Vout.

Figure 21:
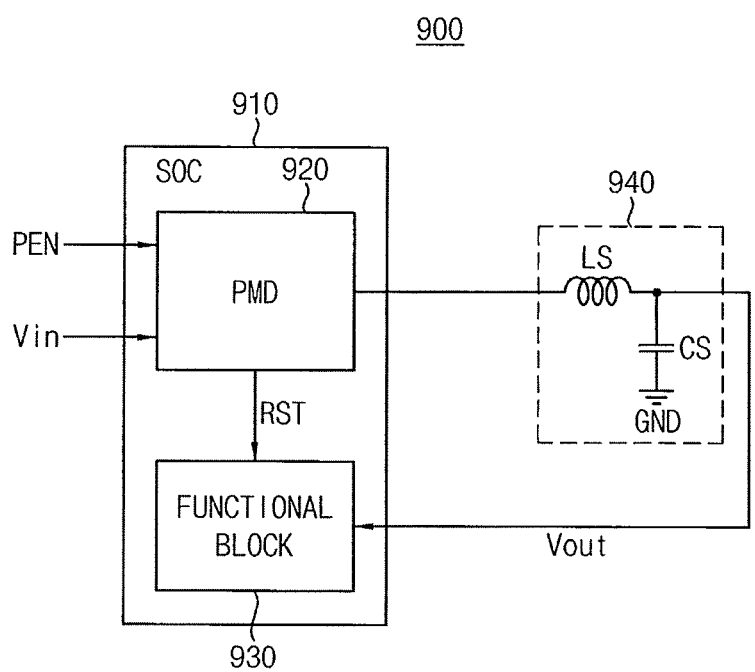
FIG. 21 is a block diagram illustrating a power management system according to an exemplary embodiment.

FIG. 21 is a block diagram illustrating a power management system according to an exemplary embodiment.

Referring to FIG. 21, a power management system 900 includes a system on chip (SoC) 910 and a filter 940. The SoC 910 includes a power management device 920 and a functional block 930.

The power management device 920 may be the power management device 700 of FIG. 19, for example. The power management device 920 generates an output current based on the input power supply voltage Vin and generates a reset signal RST based on a power enable signal PEN. The voltage converter included in the power management device 920 as described with reference to FIGS. 1 through 18 generates the at least one driving control signal by performing a PWM and a PFM based on an inductor current flowing through an inductor and the feedback voltage, adjusts feed-forwardly the charging time of the inductor based on the input power supply voltage Vin on a time basis when performing the PFM, and performs a mode transition based on an on-time control pulse. Accordingly, the power management device 820 may increase a stability by performing the mode transition stably and may increase power transfer efficiency.

The filter 940 may be implemented as a low-pass filter having an inductor LS and a capacitor CS.

The functional block 930 maintains a reset state based on the reset signal RST until the output power supply voltage VOUT reaches a steady-state. After the output voltage Vout reaches the steady-state, the functional block 930 is ready to operate and is driven based on the output voltage Vout.

Although FIG. 21 illustrates an exemplary of the power management system 900 including the filter 940 disposed outside of the SoC 910, the filter 940 alternatively may be included inside the SoC 910.

Figure 22:
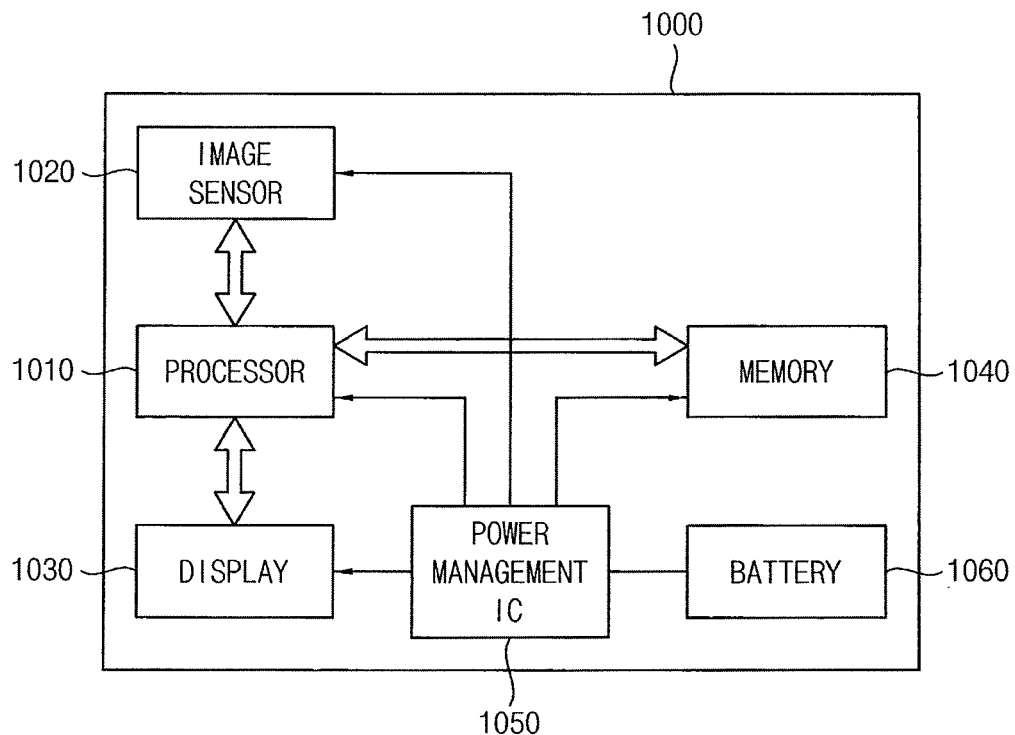
FIG. 22 is a block diagram illustrating an electronic device including the voltage converter according to an exemplary embodiment.

FIG. 22 is a block diagram illustrating an exemplary of an electronic device including the voltage converter according to an exemplary embodiment.

Referring to FIG. 22, an electronic device 1000 may be implemented as a personal computer (PC), a tablet computer, a net-book, an e-reader, a personal digital assistant (PDA), a portable multimedia player (PMP), an MP3 player, or an MP4 player. The electronic device 1000 includes a power management IC 1050 and a battery 1060.

The power management IC 1050 is provided power from the battery 1060, and may manage power of a processor 1010, an image sensor 1020, a memory 1040, or a display 1030. The power management IC 1050 may employ one of the voltage converter 10 of FIG. 1, the voltage converter 10a of FIG. 2. the voltage converter 20 of FIG. 14 and the voltage converter 600 of FIG. 18. Therefore, the power management IC 1050, as described with reference to FIGS. 1 through 18, generates the at least one driving control signal by performing a PWM and a PFM based on an inductor current flowing through an inductor and the feedback voltage, adjusts feed-forwardly the charging time of the inductor based on the input power supply voltage Vin on a time basis when performing the PFM, and performs a mode transition based on an on-time control pulse. Accordingly, the power management device 1050 may increase a stability by performing the mode transition stably and may increase power transfer efficiency.

The image sensor 1020 of the electronic device 1000 may convert an optical signal into a digital signal. The converted digital signal may be stored to the memory 1040 or displayed through the display 1030 under the control of the processor 1010. Also, the digital signal stored to the memory 1040 may be displayed through the display 1030 under the control of the processor 1010.

Figure 23:
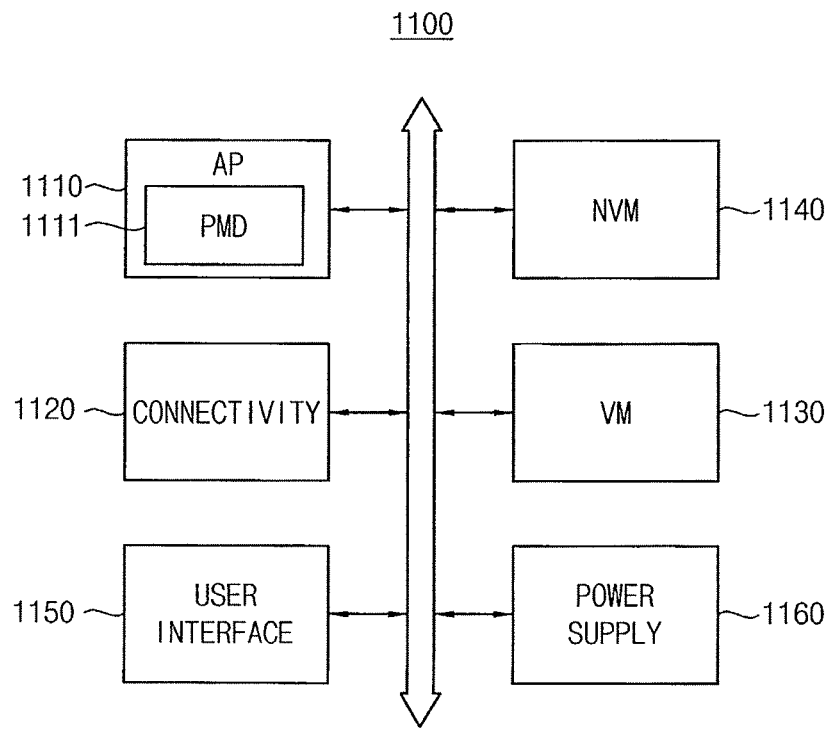
FIG. 23 is a block diagram illustrating a mobile system including the power management device of FIG. 19 according to an exemplary embodiment.

FIG. 23 is a block diagram illustrating a mobile system including the power management device of FIG. 19 according to an exemplary embodiment.

Referring to FIG. 23, a mobile system 1100 includes an application processor 1110, a connectivity unit 1120, a volatile memory device 1130, a nonvolatile memory device 1140, a user interface 1150 and a power supply 1160. According to various embodiments, the mobile system 1100 may be any mobile system, such as a mobile phone, a smart phone, a personal digital assistant (PDA), a portable multimedia player (PMP), a digital camera, a portable game console, a music player, a camcorder, a video player, a navigation system, or the like.

The application processor 1110 may execute applications, such as a web browser, a game application, a video player, or the like. The application processor 1110 may include a power management device 1111. The power management device 1111 may employ one of the voltage converter 10 of FIG. 1, the voltage converter 10a of FIG. 2. the voltage converter 20 of FIG. 14 and the voltage converter 600 of FIG. 18. The voltage converter generates the at least one driving control signal by performing a PWM and a PFM based on an inductor current flowing through an inductor and the feedback voltage, adjusts feed-forwardly the charging time of the inductor based on the input power supply voltage on a time basis when performing the PFM, and performs a mode transition based on an on-time control pulse. Accordingly, the power management device 1111 may increase a stability by performing the mode transition stably and may increase power transfer efficiency.

The connectivity unit 1120 may perform wired or wireless communications with an external device. For example, the connectivity unit 1120 may perform an Ethernet communication, a near field communication (NFC), a radio frequency identification (RFID) communication, a mobile telecommunication, a memory card communication, a universal serial bus (USB) communication, or the like. In some embodiments, the connectivity unit 1120 may include a baseband chipset that supports the communications, such as a global system for mobile communications (GSM), a general packet radio service (GPRS), a wideband code division multiple access (WCDMA), a high speed downlink/uplink packet access (HSxPA), or the like.

The volatile memory device 1130 may store data processed by the application processor 1110, or may operate as a working memory. For example, the volatile memory device 1130 may be a dynamic random access memory, such as DDR SDRAM, LPDDR SDRAM, GDDR SDRAM, RDRAM, or the like, or may be any volatile memory device that requires a refresh operation.

The nonvolatile memory device 1140 may store a boot image for booting the mobile system 1100. For example, the nonvolatile memory device 1140 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The user interface 1150 may include at least one input device, such as a keypad, a touch screen, or the like, and at least one output device, such as a speaker, a display device, or the like. The power supply 1160 may supply a power supply voltage to the mobile system 1100. In some embodiments, the mobile system 1100 may further include a camera image processor (CIS), and/or a storage device, such as a memory card, a solid state drive (SSD), a hard disk drive (HDD), a CD-ROM, or the like.

In some embodiments, the mobile system 1100 and/or components of the mobile system 1100 may be packaged in various forms, such as a package on package (PoP), ball grid arrays (BGAs), chip scale packages (CSPs), a plastic leaded chip carrier (PLCC), plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline IC (SOIC), a shrink small outline package (SSOP), a thin small outline package (TSOP), a system in package (SIP), a multi chip package (MCP), a wafer-level fabricated package (WFP), or a wafer-level processed stack package (WSP).

Figure 24:
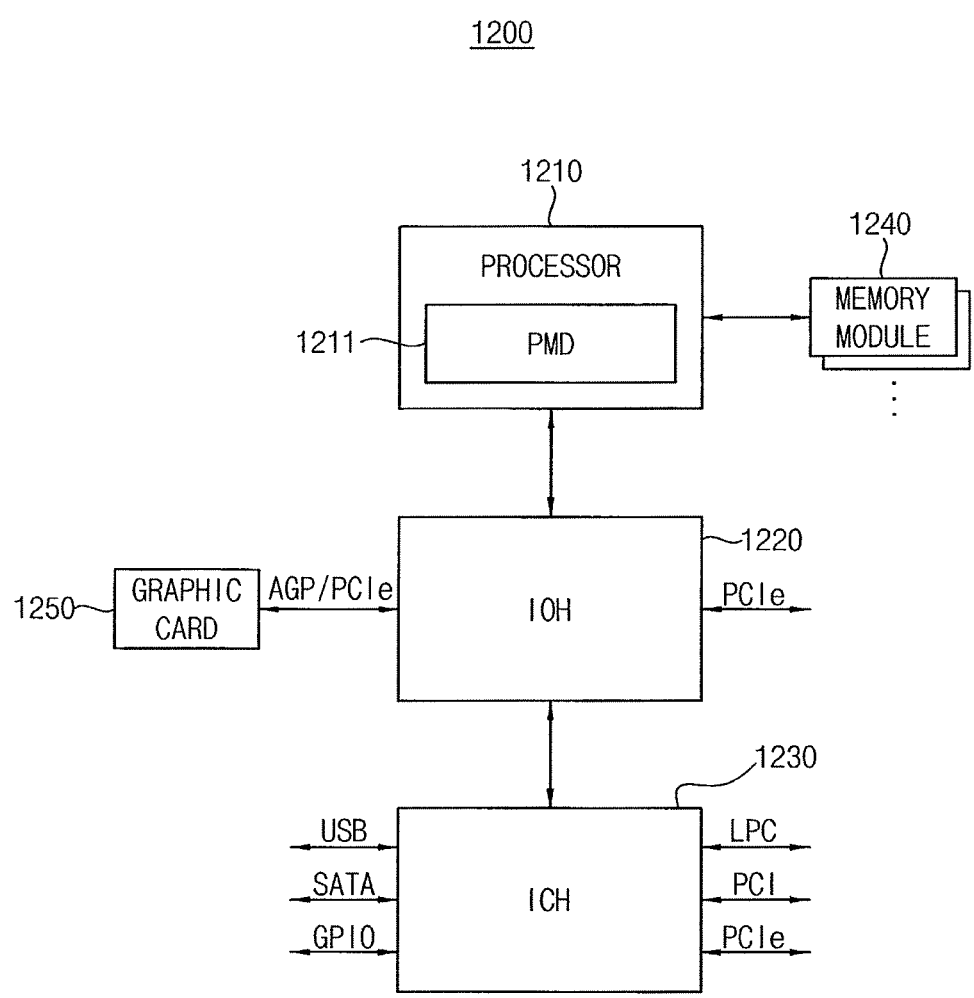
FIG. 24 is a block diagram illustrating a computing system including the power management device of FIG. 19 according to an exemplary embodiment.

FIG. 24 is a block diagram illustrating a computing system including the power management device of FIG. 19 according to an exemplary embodiment.

Referring to FIG. 24, a computing system 1200 includes a processor 1210, an input/output hub (IOH) 1220, an input/output controller hub (ICH) 1230, at least one memory module 1240 and a graphics card 1250. In some embodiments, the computing system 1200 may be a personal computer (PC), a server computer, a workstation, a laptop computer, a mobile phone, a smart phone, a personal digital assistant (PDA), a portable multimedia player (PMP), a digital camera, a digital television, a set-top box, a music player, a portable game console, a navigation system, or the like.

The processor 1210 may perform various computing functions, such as executing specific software for performing specific calculations or tasks. For example, the processor 1210 may be a microprocessor, a central process unit (CPU), a digital signal processor, or the like. The processor 1210 may include a power management device 1211. The power management device 1211 may employ one of the voltage converter 10 of FIG. 1, the voltage converter 10a of FIG. 2. the voltage converter 20 of FIG. 14 and the voltage converter 600 of FIG. 18. Therefore, the voltage converter generates the at least one driving control signal by performing a PWM and a PFM based on an inductor current flowing through an inductor and the feedback voltage, adjusts feed-forwardly the charging time of the inductor based on the input power supply voltage on a time basis when performing the PFM, and performs a mode transition based on an on-time control pulse.

In some embodiments, the processor 1210 may include a single core or multiple cores. For example, the processor 1210 may be a multi-core processor, such as a dual-core processor, a quad-core processor, a hexa-core processor, or the like. Although FIG. 24 illustrates the computing system 1200 including one processor 1210, in some embodiments, the computing system 1200 may include a plurality of processors. The processor 1210 may include an internal or external cache memory.

The processor 1210 may include a memory controller for controlling operations of the memory module 1240. The memory controller included in the processor 1210 may be referred to as an integrated memory controller (IMC). The memory controller may include structure and/or perform the methods of one or more of the embodiments described herein. A memory interface between the memory controller and the memory module 1240 may be implemented with a single channel including a plurality of signal lines, or may be implemented with multiple channels. At least one memory module 1240 may be coupled to each of the multiple channels. In some embodiments, the memory controller may be located inside the input/output hub 1220, which may be referred to as a memory controller hub (MCH).

The input/output hub 1220 may manage data transfer between the processor 1210 and devices, such as the graphics card 1250. The input/output hub 1220 may be coupled to the processor 1210 via various interfaces. For example, the interface between the processor 1210 and the input/output hub 1220 may be a front side bus (FSB), a system bus, a HyperTransport, a lightning data transport (LDT), a Quick-Path interconnect (QPI), a common system interface (CSI), or the like. Although FIG. 24 illustrates the computing system 1200 including one input/output hub 1220, in some embodiments, the computing system 1200 may include a plurality of input/output hubs. The input/output hub 1220 may provide various interfaces with the devices. For example, the input/output hub 1220 may provide an accelerated graphics port (AGP) interface, a peripheral component interface-express (PCIe), a communications streaming architecture (CSA) interface, or the like.

The graphics card 1250 may be coupled to the input/output hub 1220 via the AGP interface or the PCIe. The graphics card 1250 may control a display device (not shown) for displaying an image. The graphics card 1250 may include an internal processor for processing image data and an internal memory device. In some embodiments, the input/output hub 1220 may include an internal graphics device along with or instead of the graphics card 1250 that is disposed outside the input/output hub 1220. The graphics device included in the input/output hub 1220 may be referred to as integrated graphics. Further, the input/output hub 1220 including the internal memory controller and the internal graphics device may be referred to as a graphics and memory controller hub (GMCH).

The input/output controller hub 1230 may perform data buffering and interface arbitration to efficiently operate various system interfaces. The input/output controller hub 1230 may be coupled to the input/output hub 1220 via an internal bus, such as a direct media interface (DMI), a hub interface, an enterprise Southbridge interface (ESI), PCIe, or the like. The input/output controller hub 1230 may provide various interfaces with peripheral devices. For example, the input/output controller hub 1230 may provide a universal serial bus (USB) port, a serial advanced technology attachment (SATA) port, a general purpose input/output (GPIO), a low pin count (LPC) bus, a serial peripheral interface (SPI), PCI, PCIe, or the like.

In some embodiments, the processor 1210, the input/output hub 1220 and the input/output controller hub 1230 may be implemented as separate chipsets or separate integrated circuits. In other embodiments, at least two among the processor 1210, the input/output hub 1220 and the input/output controller hub 1230 may be implemented as a single chipset.

Use of the term "voltage converter" shall not be deemed to limit the current conversion capabilities of exemplary embodiments. Thus, a power converter may include a converting circuit connected to an input node and having a switching node, a energy storage device connected to the switching node, and a plurality of switching devices connected to the switching node; and a switching control circuit connected to control inputs of the plurality of switching devices to control the plurality of switching devices by following one of a plurality of power transfer modes at a time based on at least one feedback signal, at least one feed-forward signal, and at least one sensing signal, and switching between the plurality of power transfer modes based on a short-term current draw flowing substantially through an output node, wherein the at least one feedback signal is based on an output potential at the output node, the at least one feed-forward signal is based on an input potential at the input node, and the at least one sensing signal is based on a sensed current flowing substantially through at least one of the plurality of switching devices, and a first of the plurality of switching devices is connected between the switching node and a common node.

As mentioned above according to an exemplary embodiment, the voltage converter increases the inductor current by turning on the first driving device and turning off the second driving device using the off-timing control voltage in the switching control circuit before the second sensing signal is activated. Therefore, the voltage converter may increase the efficiency of power transferred to the load in the PFM mode. In addition, the voltage converter stably performs the mode transition based on the first and second sensing signals during a mode transition interval based on the first and second sensing signals.

While two exemplary power transfer operating modes of PWM for higher current loads and PFM for lower current loads have been shown and described, it shall be understood that either of said modes may be substituted with other applicable modes in response to various design and usage constraints. For example, the PFM mode may be substituted or used with another mode to adjust the efficiency of switching regulators under various ranges of relatively low loads, including a soft switching mode and/or a discontinuous conduction mode, for example. The present inventive concept is not limited to a particular number of modes or the particular modes described. Where an exemplary storage device has been indicated as an inductor, it shall be understood that an equivalent circuit may use a capacitor instead of or in addition to the inductor. Similarly, other storage devices may be used. A power management device or switching mode power supply (SMPS) may incorporate a voltage converter or a power converter according to embodiments of the present inventive concept.

The above-described embodiments may be applied to an integrated circuit and/or an electronic system that may benefit from a higher power transfer efficiency and a stable mode transition. For example, the above described embodiments may be applied to a power management device that supplies power to a system on a chip (SoC).

While the present disclosure has been described with reference to exemplary embodiments, it will be apparent that various changes and modifications may be made by those of ordinary skill in the pertinent art without departing from the spirit and scope of the present inventive concept. Therefore, it should be understood that the above embodiments are not limiting, but illustrative.

What is claimed is:

1. A voltage converter comprising:
a converting circuit including an inductor connected to a switching node, a first switching device connected between the switching node and a common voltage and a second switching device connected between the switching node and an output node, the first switching device configured to charge an input power supply voltage in the inductor and configured to discharge the inductor in response to a driving control signal; and
a switching control circuit configured to generate the driving control signal by performing a pulse-width modulation (PWM) and a pulse-frequency modulation (PFM) based on a first sensing signal, a second sensing signal and a feedback voltage, the first sensing signal and the second sensing signal being based on a sensed current flowing through the first switching device, the feedback voltage being obtained by dividing an output voltage at the output node,
wherein the switching control circuit is configured to adjust a charging time of the inductor on time basis, based on at least the input voltage when the switching control circuit performs the PFM.

2. The voltage converter of claim 1, wherein the switching control circuit comprises:
an on-time controller configured to generate an on-time control pulse that adjusts the charging time of the inductor based on the input power supply voltage and a reference voltage;
a pulse generation circuit configured to generate a first pulse signal by performing the PWM and configured to generate a second pulse signal by performing the PFM based on the reference voltage, the first sensing signal, the second sensing signal, the feedback voltage and the on-time control pulse, configured to generate a mode signal indicating a difference between the reference voltage and the feedback voltage, wherein the first sensing signal indicates a level of the sensed current and the second sensing signal indicates a substantially zero level of the sensed current;
a mode controller configured to select one of the first pulse signal and the second pulse signal as an output pulse signal according to the mode signal and an operation mode based on the on-time control pulse; and
a driving controller configured to generate the driving control signal based on the output pulse signal.

3. The voltage converter of claim 2, wherein the mode controller is configured to select one of the first pulse signal and the second pulse signal as the output pulse signal based on comparing a first on-time and a second on-time, and
wherein the first on-time corresponds to a first activation interval of the first pulse signal and the second on-time corresponds to a second activation interval of the second pulse signal.

4. The voltage converter of claim 3, wherein the mode controller is configured to change the operation mode from a PWM mode to a PFM mode when the first on-time is smaller than the second on-time by at least a reference number.

5. The voltage converter of claim 2, wherein the on-time controller comprises:
   an enable signal generator configured to generate a first enable signal and a second enable signal based on control signals from outside and a reference pulse signal;
   a current mirror circuit configured to generate a charging current by mirroring a reference current in response to the first enable signal; and
   an on-time pulse generator configured to generate the on-time control pulse based on the first enable signal, the second enable signal, the charging current and the reference voltage and the input power supply voltage.

6. The voltage converter of claim 5, wherein the on-time pulse generator comprises:
   a first capacitor connected between a first node coupled to the current mirror circuit and the common voltage, the first capacitor storing the charging current;
   a first switch connected in parallel with the first capacitor between the first node and the common voltage, the first switch being switched in response to the second enable signal;
   at least one second switch and at least one second capacitor connected in series between the first node and the common voltage;
   a comparator configured to compare a ramp voltage at the first node and the reference voltage; and
   a flip-flop that has a set terminal receiving the first enable signal, a reset terminal receiving an output of the comparator and an output terminal providing the on-time control pulse.

7. The voltage converter of claim 6, wherein an on-time of the on-time control pulse is varied according to a level of the ramp voltage.

8. The voltage converter of claim 2, wherein the pulse generation circuit comprises:
   a first pulse generator configured to generate the first pulse signal based on the reference voltage, the feedback voltage and the first sensing signal; and
   a second pulse generator configured to generate the second pulse signal based on the reference voltage, the feedback voltage, the second sensing signal and the on-time control pulse.

9. The voltage converter of claim 8, wherein the second pulse generator comprises:
   a first hysteresis comparator configured to generate a PFM signal corresponding to a difference between the feedback voltage and the reference voltage, the first hysteresis comparator having a variable hysteresis window;
   a second hysteresis comparator configured to generate the mode signal corresponding to a difference between the reference voltage and the feedback voltage;
   a first OR gate that performs an OR operation on the PFM signal and the second sensing signal;
   a second OR gate that performs an OR operation on the mode signal and the on-time control pulse; and
   a flip-flop that has a set terminal receiving an output of the first OR gate, a reset terminal receiving an output of the second OR gate and an output terminal providing the second pulse signal.

10. The voltage converter of claim 2, wherein the mode controller comprises:
    a time comparator configured to compare a first on-time corresponding to first activation interval of the first pulse signal and a second on-time corresponding to a second activation interval of the second pulse signal to output a time comparison signal;
    a counter configured to count the time comparison signal having a first logic level to output a counting output signal;
    a signal generator configured to generate a reset signal and a selection signal based on the counting output signal and the mode signal; and
    a selection circuit configured to select one of the first pulse signal and the second pulse signal as the output pulse signal in response to the selection signal.

11. The voltage converter of claim 10, wherein the counter is configured to output the counting output signal as a first logic level when the time comparator consecutively outputs the time comparison signal as a first logic level by a reference number of times.

12. The voltage converter of claim 1, wherein the converting circuit further comprises:
    a third switching device connected between the input power supply voltage and the inductor, the third switching device switching the input power supply voltage to the inductor in response to a boosting control signal,
    wherein the third switching device includes a p-channel power switch.

13. A voltage converter comprising:
    a converting circuit including an inductor connected to a switching node, a first switching device connected to the switching node and a second switching device connected between the switching node and an output node, the first switching device configured to charge an input power supply voltage in the inductor in response to a first driving control signal and the second switching device configured to discharge the inductor in response to a second driving control signal; and
    a switching control circuit configured to generate the first driving control signal and the second driving control signal by performing a pulse width modulation (PWM) and a pulse frequency modulation (PFM) based on a first sensing signal, a second sensing signal and a feedback signal, the first sensing signal and the second sensing signal being based on an inductor current flowing through the inductor, a feedback voltage being obtained by dividing an output voltage at the output node,
    wherein the switching control circuit is configured to adjust a charging time of the inductor on a time basis, based on at least the input voltage when the switching control circuit performs the PFM.

14. The voltage converter of claim 13 configured as a buck converter, wherein the switching control circuit comprises:
    an on-time controller configured to generate an on-time control pulse that adjusts the charging time of the inductor based on the input power supply voltage and a reference voltage;
    a pulse generation circuit configured to generate a first pulse signal by performing the PWM, configured to generate a second pulse signal by performing the PFM based on the reference voltage, the first sensing signal, the second sensing signal, the feedback voltage and the on-time control pulse, and configured to generate a mode signal indicating a difference between the reference voltage and the feedback voltage, wherein the first sensing signal indicates a non-zero level of the inductor current and the second sensing signal indicates a substantially zero level of the inductor current;

a mode controller configured to select one of the first pulse signal and the second pulse signal as an output pulse signal according to the mode signal and an operation mode based on the on-time control pulse; and a driving controller configured to generate the first driving control signal and the second driving control signal based on the output pulse signal, wherein a level of the output voltage is lower than a level of the input power supply voltage.

15. A power converter comprising:

a converting circuit connected to an input node and having a switching node, an energy storage device connected to the switching node, and a plurality of switching devices connected to the switching node; and a switching control circuit connected to control inputs of the plurality of switching devices to control the plurality of switching devices by following one of a plurality of power transfer operating modes at a time based on at least one feedback signal, at least one feed-forward signal, and at least one sensing signal, and switching between the plurality of power transfer operating modes based on a current flowing substantially through an output node, wherein the at least one feedback signal is based on an output potential at the output node, the at least one feed-forward signal is based on an input potential at the input node, and the at least one sensing signal is based on a sensed current flowing substantially through at least one of the plurality of switching devices, and a first of the plurality of switching devices is connected between the switching node and a common node.

16. The power converter of claim 15, wherein each of the plurality of switching devices is controlled by a corresponding one of a plurality of control signals, and at least one of the plurality of control signals is based on a sensed current flow through at least one of the first switching device or the energy storage device.

17. The power converter of claim 16 wherein:

the switching control circuit is configured to generate the at least one of the plurality of control signals for controlling the at least one of the plurality of switching devices by performing a pulse-width modulation (PWM) and a pulse-frequency modulation (PFM) based on a first sensing signal, a second sensing signal and a feedback signal, the first sensing signal and the second sensing signal are each based on a sensed current flowing through at least one of the first switching device or the energy storage device, the feedback signal is based on an output voltage potential at the output node, and at least one of the plurality of switching devices is configured to discharge the energy storage device in response to the at least one control signal.

18. The power converter of claim 15 configured to provide low output current when the switching control circuit performs pulse-frequency modulation (PFM) as one of the plurality of power transfer operating modes, wherein the switching control circuit is configured to adjust a charging time of the energy storage device based on at least a power supply voltage potential at the input node.

19. The power converter of claim 17, wherein:

the first sensing signal and the second sensing signal are based on the sensed current flowing through the first switching device, the first of the plurality of switching devices is configured to discharge an inductor in response to a first of the at least one control signal, a second of the plurality of switching devices is connected between the switching node and the output node and configured to substantially pass an output voltage potential to the output node in response to a second of the least one control signal, and a third of the plurality of switching devices is connected between the switching node and the input node and configured to charge the inductor with an input power supply voltage in response to a third of the least one control signal.

20. The power converter of claim 19, wherein:

the energy storage device is the inductor, and the switching control circuit is configured to adjust a charging time of the inductor based on at least a voltage potential at the input node when the switching control circuit performs PFM as one of the plurality of power transfer operating modes.

* * * * *